US009933536B2

(12) United States Patent
Gagliardi et al.

(10) Patent No.: US 9,933,536 B2
(45) Date of Patent: Apr. 3, 2018

(54) ARCTIC SEISMIC SURVEYING OPERATIONS

(71) Applicant: ION Geophysical Corporation, Houston, TX (US)

(72) Inventors: Joseph R. Gagliardi, Katy, TX (US); Shawn Rice, Spring, TX (US); Curt Schneider, Houston, TX (US); Jeffrey W. Cunkelman, Sugar Land, TX (US); Tim Dudley, Houston, TX (US); Dale Lambert, Mandeville, LA (US); Mike Burnham, Houston, TX (US); Ray Pierce, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 556 days.

(21) Appl. No.: 14/216,935

(22) Filed: Mar. 17, 2014

(65) Prior Publication Data
US 2014/0269174 A1    Sep. 18, 2014

Related U.S. Application Data

(63) Continuation-in-part of application No. 13/793,544, filed on Mar. 11, 2013, now Pat. No. 9,535,182.
(Continued)

(51) Int. Cl.
*G01V 1/38* (2006.01)
(52) U.S. Cl.
CPC .............. *G01V 1/3808* (2013.01); *G01V 1/38* (2013.01)
(58) Field of Classification Search
CPC ................................ G01V 1/38; G01V 1/3808
(Continued)

(56) References Cited

U.S. PATENT DOCUMENTS 4,744,698 A    5/1988 Dallimer et al.
5,113,376 A    5/1992 Bjerkoy
(Continued)

FOREIGN PATENT DOCUMENTS

GB    WO 2012016231 A1 * 11/2012 ............... G08G 3/02
RU        2317572 C1    2/2008
(Continued)

OTHER PUBLICATIONS

Danish Search Report and Search Opinion regarding corresponding Danish Application No. PA2014 70703, dated Aug. 10, 2015.
(Continued)

*Primary Examiner* — Ian J Lobo
(74) *Attorney, Agent, or Firm* — Blank Rome LLP

(57) ABSTRACT

A marine seismic survey is performed in icy waters by initially planning a survey track traversing a survey area. The initial track is planned based on initial ice conditions in the survey area having the icy waters. After preparing the system, a seismic system is deployed into the water from a survey vessel at the survey area. This is typically done in an area relatively free of ice. At least one escort vessel escorts the survey vessel as it traverses the survey track and obtains seismic data. The survey vessel tows the seismic system under the surface of the icy water to avoid the ice. All the while, systems and operators monitor the survey area along the survey track for actual ice conditions. In this way, the escort vessel can handling the actual ice conditions along the survey track so the survey vessel does not need to halt.

25 Claims, 12 Drawing Sheets

Related U.S. Application Data which is a continuation-in-part of application No. 12/719,783, filed on Mar. 8, 2010, now Pat. No. 8,593,905.

(60) Provisional application No. 61/793,446, filed on Mar. 15, 2013, provisional application No. 61/158,698, filed on Mar. 9, 2009, provisional application No. 61/246,367, filed on Sep. 28, 2009, provisional application No. 61/261,329, filed on Nov. 14, 2009.

(58) Field of Classification Search
USPC .......................................................... 367/15
See application file for complete search history.

(56) References Cited

U.S. PATENT DOCUMENTS

| | | | |
|---|---|---|---|
| 5,157,636 A | 10/1992 | Bjerkoy | |
| 2010/0226204 A1 | 9/2010 | Gagliardi et al. | |
| 2011/0188938 A1* | 8/2011 | Nedwed | E02B 3/00 405/79 |
| 2011/0228636 A1 | 9/2011 | Kambiz et al. | |
| 2012/0316769 A1* | 12/2012 | Gagliardi | G08G 3/02 701/300 |

FOREIGN PATENT DOCUMENTS

| | | |
|---|---|---|
| RU | 238802 C1 | 4/2010 |
| SU | 1835938 A1 | 4/1995 |
| WO | 2012162310 A1 | 11/2012 |
| WO | 2013009245 A1 | 1/2013 |

OTHER PUBLICATIONS

Jokat, "Seismic investigations along the western sector of Alpha Ridge, Central Arctic Ocean", Geophys. J. Int. (2003) 152, 185-201 e.g. section "Experimental Set-Up".

Ross et al., "A Case Study of a High Latitude Towed Streamer 3D Seismic Survey", 72nd EAGE Conference and Exhibition incorporating SPE EUROPEC 2010, Barcelona, Spain, Jun. 14-17, 2010 e.g. section "Method".

Bamford, David, "How Can We Explore the Russian Arctic Shelf?" GEO ExPro—Geoscience and Technology Explained, vol. 8, No. 5, 2012, 9 pages, obtained from http://www.geoexpro.com/articles/2012/01/how-can-we-explore-the-russian-arctic-shelf.

Frantzen, Erling, "From Russia with Love," Arctic Operations, E&P—A Hart Energy Publication, May 2007, 4 pages.

Petterson, Trude, "Russia Finishes Seismic Surveys of Shelp Limits," Barents Observer, Oct. 24, 2012, 5 pages obtained from http://barentsobserver.com/en/arctic/russia-finishes-seismic-surveys-shelf-limits-24-10.

Rice, Shawn L., et al., "Arctic Seismic Acquisition and Processing," The Leading Edge—Special Section: Arctic/ATC, May 2012, 7 pages.

"SMG Russian High Arctic—Contract Completion," WGP Group, Oct. 23, 2012, 2 pages, obtained from http://www.wgp-group.com/news/2012/728/.

"WGP Completes Arctic 2D Seismic Survey," Rigzone, Oct. 23, 2012, 2 pages, obtained from http://www.rigzone.com/news/oil_gas/a/121553/WGP_Completes_Arctic_2D_Seismic_Survey.

International Search Report and Written Opinion regarding corresponding PCT Application No. PCT/US2014/030697, dated Aug. 22, 2014.

Ridsdell-Smith, Tom et al., "Benefits of two-boat 4D acquisition, an Australian case study," The Leading Edge—Special Section: Seismic Acquisition, Jul. 2008, pp. 940-944.

Ross et al, "A Case Study of a High Latitude Towed Streamer 3D Seismic Survey," 72nd EAGE Conference & Exhibition incorporating SPE EUROPEC 2010, Barcelona, Spain, Jun. 14-17, 2010, 5 pages.

Second Examination Report in corresponding Danish Application No. PA2014 70703, dated Mar. 2, 2016.

First Office Action in corresponding Canadian Application No. 2,911,840, dated Nov. 4, 2016.

Third Examination Report in corresponding Danish Application No. PA2014 70703, dated Dec. 14, 2016.

Decision on Grant in corresponding Russian Application No. 2015144061, dated Jan. 10, 2017.

\* cited by examiner

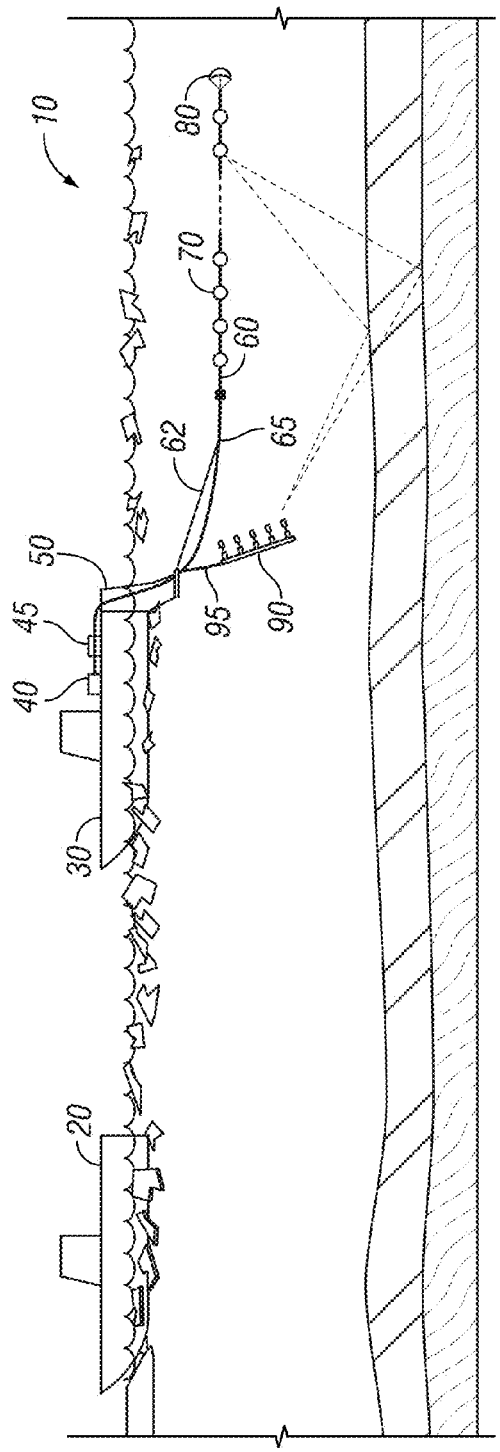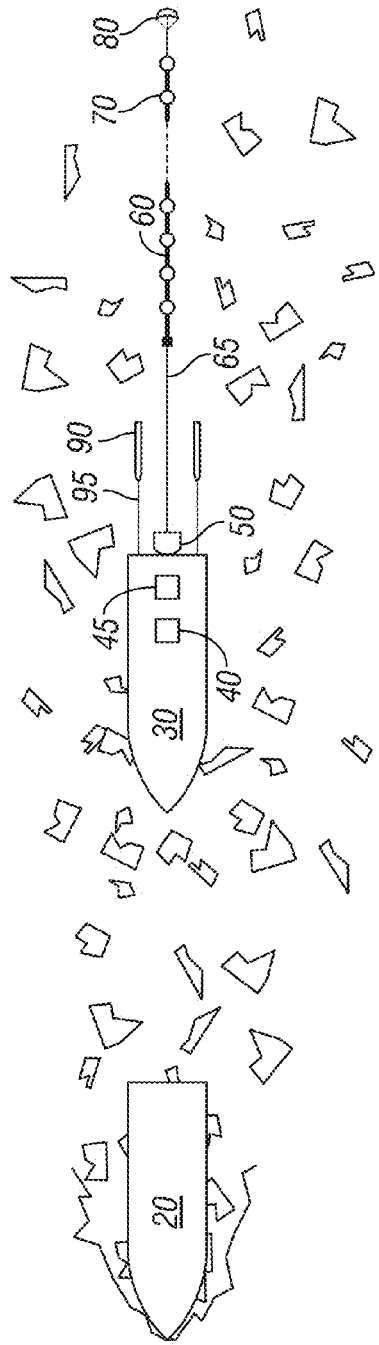
FIG. 1A
FIG. 1B

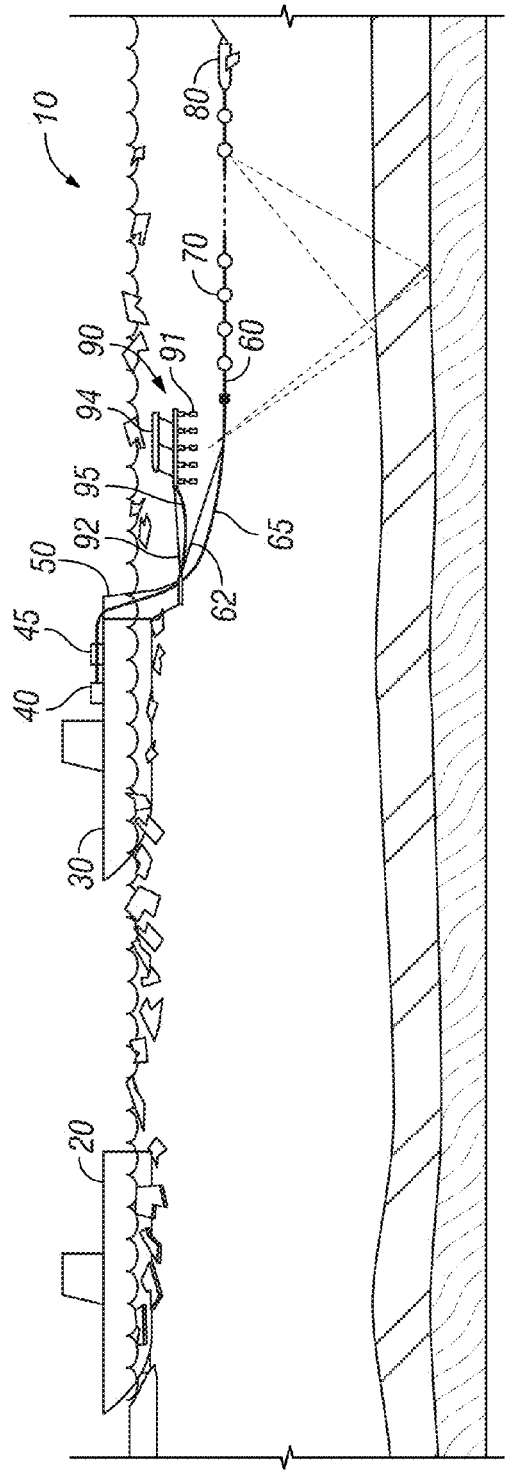
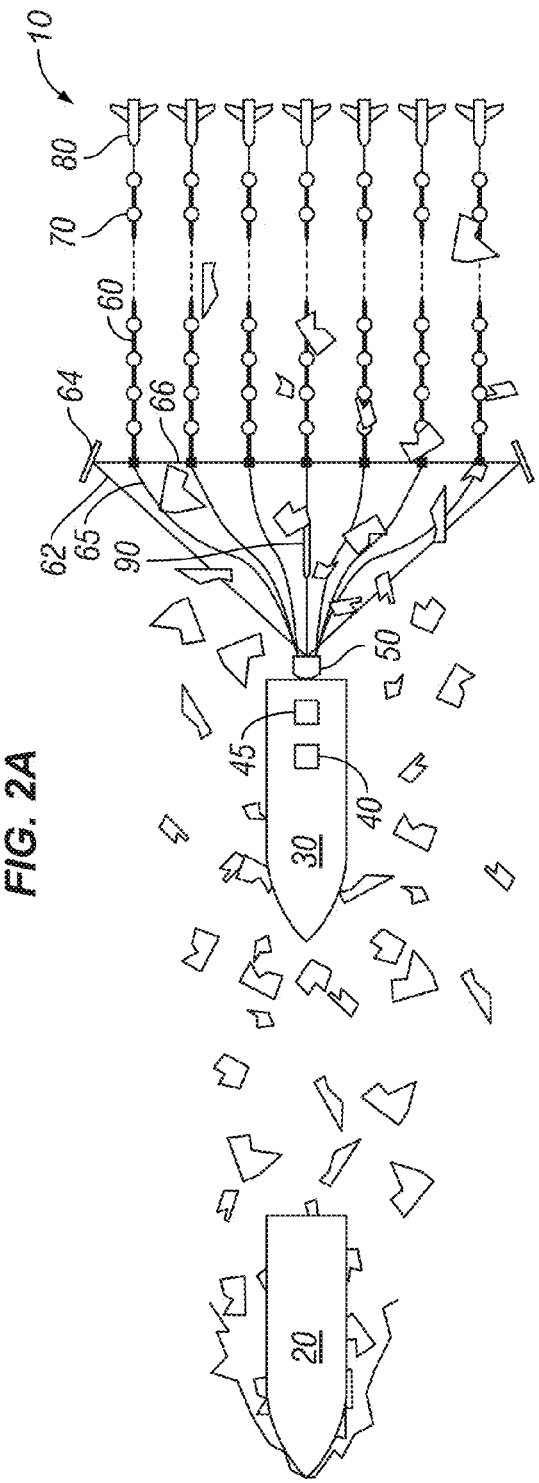
FIG. 2A
FIG. 2B

ARCTIC SEISMIC SURVEYING OPERATIONS

CROSS-REFERENCE TO RELATED APPLICATIONS

This application is a continuation-in-part of U.S. application Ser. No. 13/793,544, filed 11 Mar. 2013, and claims the benefit of U.S. Prov. Appl. 61/793,446, filed 15 Mar. 2013, which are both incorporated herein by reference in their entireties.

BACKGROUND OF THE DISCLOSURE

Conventional marine seismic surveying uses a seismic source and a number of streamers towed behind a seismic survey vessel. These streamers have sensors that detect seismic energy for imaging the formations under the seafloor. Deploying the streamers and sources and towing them during a survey can be relatively straightforward when operating in open waters with moderate swells or the like.

Marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can complicate the seismic record produced.

Additionally, the ice floes on the water's surface make towing the source and streamers more difficult and prone to damage. For example, any components of the system at the water's surface can encounter ice, become bogged down, and lost. In addition, any cables or towlines coming off the vessel even from slipways can collect ice at the surface. Likewise, ice pulled under the hull and rising behind the vessel can shear away these cables and lines.

Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed. The subject matter of the present disclosure is directed to overcoming, or at least reducing the effects of, one or more of the problems set forth above.

SUMMARY OF THE DISCLOSURE

A marine seismic survey is performed in icy waters by initially planning a survey track traversing a survey area. The initial track is planned based on initial ice conditions in the survey area having the icy waters. After preparing the system, a seismic system is deployed into the water from a survey vessel at the survey area. This is typically done in an area relatively free of ice. At least one escort vessel escorts the survey vessel as it traverses the survey track and obtains seismic data. The survey vessel tows the seismic system under the surface of the icy water to avoid the ice. All the while, systems and operators monitor the survey area along the survey track for actual ice conditions. In this way, the escort vessel can handling the actual ice conditions along the survey track so the survey vessel does not need to halt.

BRIEF DESCRIPTION OF THE DRAWINGS

FIGS. 1A-1B illustrate side and plan views of a marine seismic survey system having an escort vessel and a survey vessel that traverse a survey track together to perform marine seismic surveying in icy waters, such as encountered in the Arctic.

FIGS. 2A-2B show side and plan views of a marine seismic survey system according to certain teachings of the present disclosure for use in icy regions.

DETAILED DESCRIPTION OF THE DISCLOSURE

A. System Overview

Figure 3:
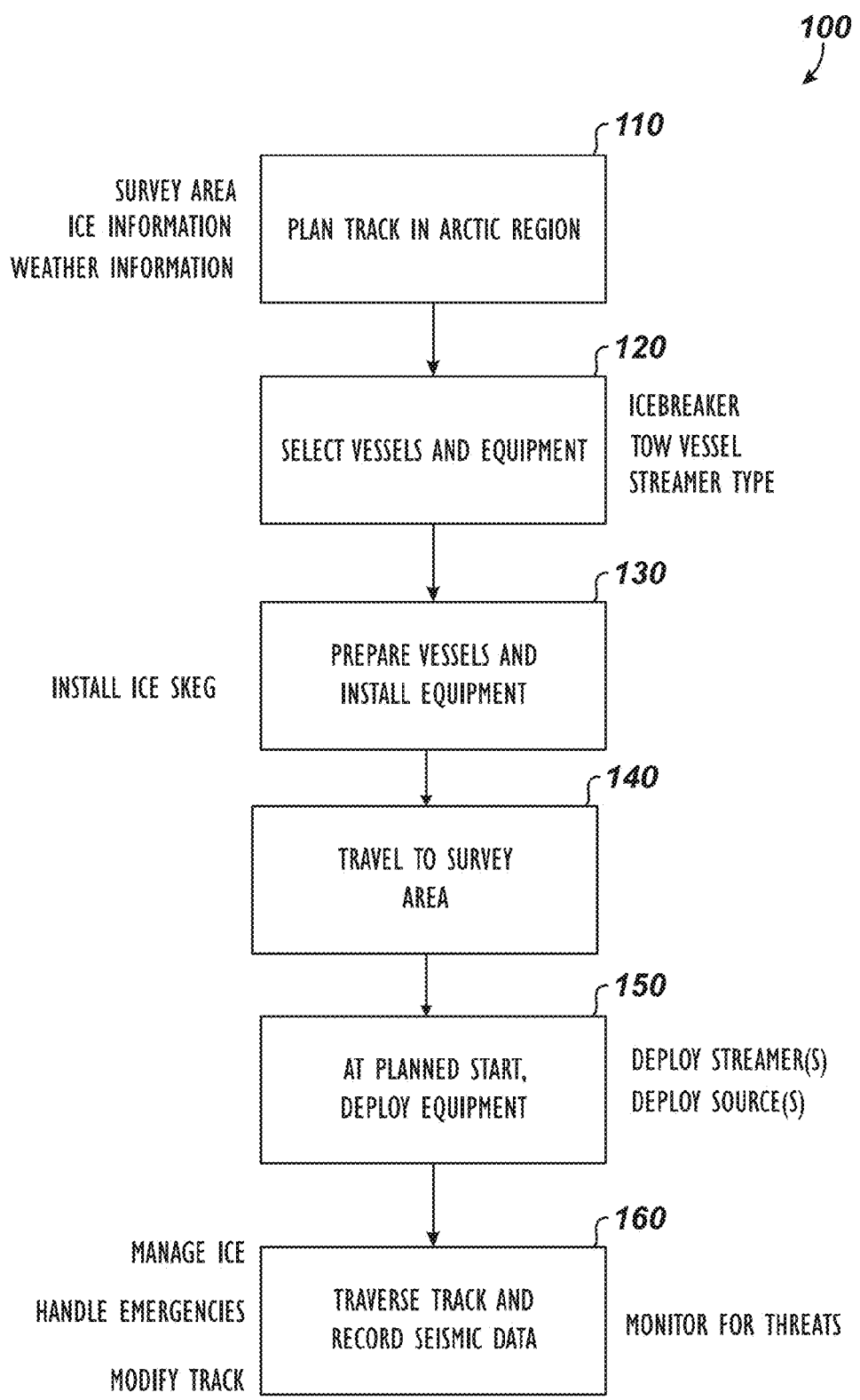
FIG. 3 illustrates a set of procedures for performing seismic surveys in icy waters, such as in the arctic or other Polar Regions.

A marine seismic survey system 10 is illustrated in FIGS. 1A-1B and in FIGS. 2A-2B. The system 10 has an escort vessel 20 and a survey vessel 30 that traverse a survey track together to perform marine seismic surveying in icy waters, such as encountered in the Arctic or other Polar Region. The seismic survey system 10 uses equipment and techniques as disclosed in the incorporated U.S. patent applications.

The system 10 can be used in icy regions having glacial ice, pack ice, ice floes, or other obstructions or obstacles at the water's surface that can interfere with towed components of the marine seismic survey system 10. In this particular system 10, the escort vessel 20 is an icebreaker that travels ahead of the survey vessel 30 and is tasked with breaking up ice floes, moving ice obstacles, and other procedures detailed below. The survey vessel 30 conducts the seismic survey by towing seismic equipment (e.g., one or more streamers 60 and one or more seismic sources 90) behind the vessel 30.

Escort by an additional vessel (not shown) may be used in some routes and local ice regimes. Under some circumstances, for example, such an additional escort vessel can ease the ice conditions along the route by breaking large pieces of dangerous ice or assisting the vessels 20 and 30 to maneuver around them. However, there are some situations when the effectiveness of the escort vessel 20 could be limited, such as when the track becomes narrow indicating that the ice is under pressure. Various preventive steps and remedies are disclosed herein to handle this type of situation.

As the survey is conducted along a survey track, the ice-breaking vessel 20 and/or the survey vessel 30 itself may break pack ice ahead of the towed streamers 60 and sources 90. The vessels 20 and 30 traverse the survey track, and seismic signals from the source 90 are generated. The sensors 70, which can be hydrophones or the like) disposed on the streamers 60 detect seismic energy, which is recorded as part of the seismic record for the survey.

As the survey vessel 30 tows the streamers 60, for example, a supply system 45 operates the source(s) 90, and a control system 40 on the vessel 30 having a seismic recorder records the seismic data obtained with the sensors 70 on the streamers 60. To protect the connection from the vessel 30 to the streamers 60 and the sources 90, the survey vessel 30 has an ice skeg 50 that mounts on the vessel 30 and preferably on the vessel's aft or stern. The skeg's distal end extends below the vessel's waterline and can even extend several meters below the vessel's keel.

The towed equipment of the survey system 10 deploys from the vessel 30 and has a number of cables 65 for the streamers 60 and cables 95 for the seismic sources 90. To protect these cables 65 and 95, a channel in the ice skeg's after edge holds the cables 65 and 92 and directs them below the vessel's waterline. In this way, surface ice cannot interfere with the cables 65 and 95 while the streamers 60 and sources 90 are being towed.

In particular, the streamer cables 65 connected to the seismic recorder of the control system 40 extend form the vessel 30, and the skeg 50 directs these streamer cables 65 below the water's surface so that ice will not interfere with or collect around the cables 65. For its part, the seismic source 90 has a plurality of seismic source elements 91, which are typically air guns, and a supply cable 95 connected to the supply system 45 extends from the vessel 30 to the source. The ice skeg 50 directs the supply cables 95 below the water's surface so that ice will not interfere with or collect around these cables 95 either.

Extended below the vessel's waterline, the ice skeg 50 also has various attachment points for towlines 62/92 that are kept below the surface of the water. For example, a towline 62 connects the streamer's cable 65 to the ice skeg 50 and helps tow the streamer 60 under water behind the vessel 30. Likewise, a towline 92 connects the source's cable 95 to the ice skeg 50 and helps tow the source 90 behind the vessel 30.

Because the streamers 60 are towed below the water's surface, the streamers 60 can have deployed devices, including fins, wings, paravanes, glider buoys, Remotely Operated Vehicles (ROVs), Remotely Operated Towed Vehicles (ROTVs), and Autonomous Operated Vehicles (AOVs), which can be capable of directional and positioning control. For example, the controllable deployed devices can be towed vehicles that can position the streamers 60 individually in lateral or vertical positions under the water's surface. In addition, ends of the streamers 60 can have particular controllable vehicles with Global Positioning System (GPS) receivers to locate the streamers 60 and their sensors 70.

To facilitate locating the streamers 60 and the sensors 70 for the survey, tail buoys (not shown) can be provided that float at the water's surface to obtain GPS readings. Alternatively, if controllable devices 80 are used at the tails of the streamers 60, the controllable devices 80 can be intermittently brought to the surface when clear of ice floes or other obstructions so GPS readings can be obtained with the devices 80 and communicated to the control system 40. After obtaining the GPS readings, the controllable devices 80 can float back under the surface. An Inertial Navigation System (INS) device, integrated navigation system, or other system can be used to supplement the GPS readings so the location of the streamers 60 can be determined even when significant ice floes at the surface prevent the controllable devices 80 from obtaining GPS readings.

As further shown in FIG. 2B, paravanes, fins, or doors 64 and a spreader 66 can be used to support multiple streamers 60 behind the survey vessel 30. These paravanes 64 and spreader 66 can also be similar to conventional components used for marine seismic surveying, except that the paravanes 64 preferably tow under the water's surface to avoid ice at the water's surface.

Finally, different configurations of sources 90 can be used. In FIGS. 1A-1B, for example, two sources 90 can be used and can be towed vertically. When operating the vertically-arranged source 90, the firing of the source elements or guns 91 can be timed to account for any tilt that the vertical source 90 has. This timed firing can maintain the fidelity of the source 90 and keep a downward facing characteristic of the seismic source signal produced.

Accordingly, the array for the vertically-arranged source 90 can be fitted with at least one ultra-short baseline (USBL) transceiver and one pressure transducer at the end of the array. The USBL transducer is interrogated by a USBL system (not shown) located on the vessel 30. The drape (tow) angle from vertical of the source 90 is measured, and an appropriate timing delay is calculated and applied to each gun 91 of the source 90. In this case, the source 90 is positioned using direct layback from the vessel's reference point.

In FIGS. 2A-2B, the source(s) 90 can be towed horizontally behind the vessel 30. Some conventional seismic practices related to a source can be used for the source(s) 90. For example, the array for the source 90 can be fitted with at least two near field hydrophones, a depth transducer at each gun station, and one pressure transducer per sub-array. However, other practices are followed due to towing in icy waters. In the towed survey system 10 behind the vessel 30, for example, a floatation device 94 may be used to support the source 90 horizontally. Preferably, this device 94 floats below the water's surface to avoid ice floes. Further details related to the marine seismic survey system 10 are disclosed in the incorporated U.S. patent applications.

B. Procedures

As will be appreciated from the above-description of the system 10, seismic surveying in the Arctic or other areas covered with ice has unique challenges so the seismic surveying requires particular procedures for working in ice regimes. To that end, FIG. 3 illustrates a set of procedures 100 for performing seismic surveys in icy waters, such as in the Arctic or other Polar Regions. This set of procedures 100 gives a general outline of the seismic survey operations in icy waters. Particulars related to the procedures 100 are provided in more detail later.

At the outset, operators carefully plan a track for surveying a desired area of the ocean where ice is (or may be) located (Block 110). Of course, the survey track is planned to best survey the ocean surface to be explored. Unlike conventional surveying where the survey vessel 30 can simply traverse the area without much hindrance, operators plan the survey track in the icy region with particular consideration to weather conditions, current and historical ice regimes, and the like.

Concurrent with planning of the survey track, operators select the necessary vessels 20 and 30 and equipment of the seismic system 10 to conduct the planned survey (Block 120). These selections are made with consideration to the environment of the icy regions expected to be encountered. For example, the vessels 20 and 30 are selected to handle the expected ice regime, weather conditions, and the like. The same considerations apply to choice of the streamers 60, the sources 90, and other seismic equipment of the system 10.

Once the vessels 20 and 30 and system equipment are selected, operators prepare the vessels 20 and 30 and install the system equipment (Block 130). These preparations can include outfitting the survey vessel 30 with particular equipment for conducting the seismic survey in ice, such as installing an ice skeg 50 on the survey vessel 30, modifying decks on the vessel 30, and upgrading other equipment as needed.

After all of these procedures, operators can begin the planned seismic survey by taking the system 10 out to the start of the planned track (Block 140). Even the travel of the vessels 20 and 30 to the desired region requires particular planning when the region has ice, such as in the Arctic. For example, an initial route may need to be planned to bring the survey vessel 30 to an appropriate starting location so the equipment of the system 10 can be deployed without much interference from ice.

Once at the planned start, operators then begin deploying the equipment to commence the seismic survey (Block 150). For example, the streamers 60 and sources 90 are deployed. Because these procedures are done in or near icy waters, operators use deployment techniques different than the overall conventional deployment procedures used in normal operating waters.

Finally, operators conduct the seismic survey with the equipment deployed by traversing the planned survey track (Block 160). Because the icy region changes dynamically and has a number of potential dangers and impediments, operators continually monitor for threats, manage ice, modify the track if necessary, and handle emergencies.

With an understanding of the seismic survey system 10 and the set of procedures 100 for conducting the survey in icy waters, discussion not turns to particular details of the system 10 and procedures 100 for conducing seismic surveys in icy waters.

C. Arctic Planning

As noted above in Block 110 of FIG. 3, seismic surveying begins with operators carefully planning the track for surveying a desired area of the ocean where ice is (or may be) located. To determine the best plan for surveying, operators analyze the ice in the region of interest for current and previous years of ice coverage to determine a suitable location in which to start the survey. The finishing point of the survey can be chosen as the easier portion where new ice is forming, for example.

Using the designated tracks and lines desired to survey the seafloor as a guide, operators then develop an initial shooting plan that will enable the survey vessel 30 to traverse the survey tracks and lines and ultimately obtain the desired seismic data. To do this, operators obtain useful information to assess the region, the ice, and other features and then develop the initial plan. The useful information includes satellite images, ice charts, weather forecasting, ice modeling, and the like from various sources, such as Arctic and Antarctic Research Institute (AARI), Canatec, and Danish Meteorological Institute (DMI). The useful information also includes geotagging images; ice condition maps; prediction surface pressure fields; meteorological forecasts; ice floe compression forecasts; ice drift forecasts; forecasts of localization and move of breaks in ice floes; wave forecasts for ice-free waters; ice aerial reconnaissance; ice depth measurements; AES images; ice maps; and ice forecasts.

The satellite imagery can include MODIS, Envisat, and RADARSAT. For example, Radarsat provides a high resolution radar image of the satellite swath. Both the picture resolution and swath width can be varied within limits. MODIS imagery provides strong pictorial information when the aperture views are not obstructed by cloud cover.

In many areas of the Arctic, assessments of the ice regimes and concentrations can be determined for multiple years. For example, AARI (Arctic and Antarctic Research Institute) data can be used to analyze the ice for various years and can be used to determine where to start the survey at a particular area and how to progress in the survey to finish in an area of new ice forming. This approach may be the most pragmatic approach, although other options might result in greater data collection in the long streamer mode.

Based on the assessment, operators can plan the shooting plan and the survey parameters to mitigate issues. For example, the survey may by necessity be conducted in ice regimes of high concentrations of ice (+90%). If this is the case, the streamer(s) 60 for the survey can be shortened (e.g., to 500-m). In addition, the assessment may determine what types of ice may be predominant in the survey area, and knowledge of the type of ice to be encountered can provide operators with useful tactical considerations in developing the shooting plan and planning for contengencies. As an example, the survey area may be dominated by thick first-year (TFY) ice, multiyear (MY) ice, etc. so that areas of heavy ridging, hummocking, and ice-pressure may educate the operator's tactical considerations and planned route.

Figure 4:
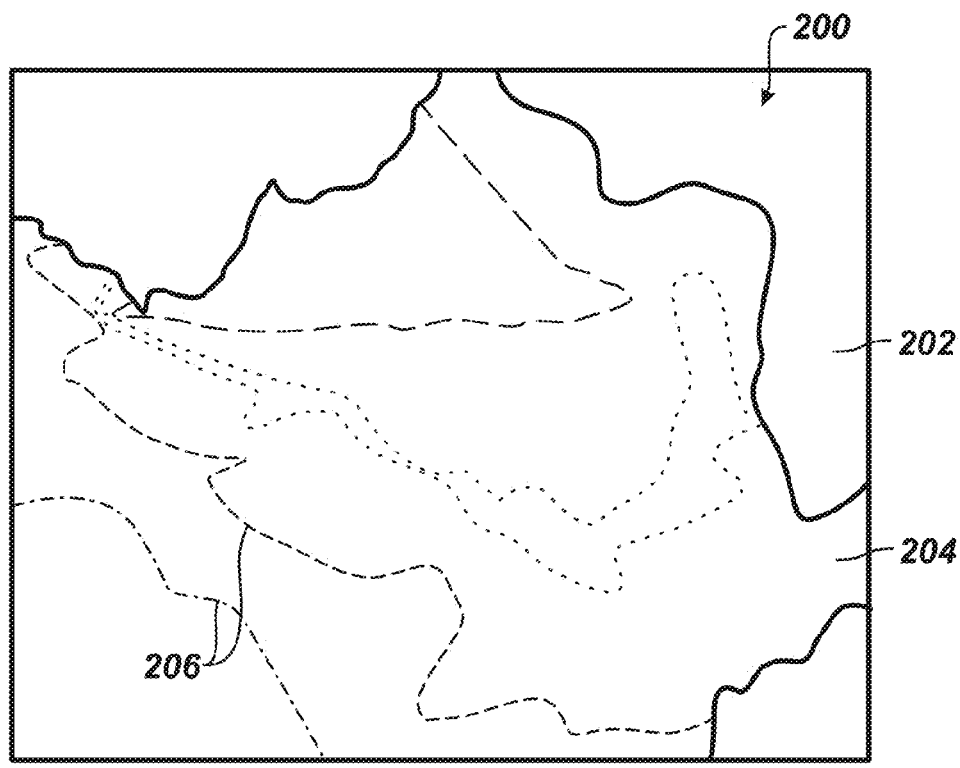
FIG. 4 diagrammatically illustrates an arctic sea region having historical ice thicknesses charted thereon.

As an example, FIG. 4 diagrams a satellite image 200 having surrounding land masses 202 and ocean 204. The image 200 shows various thicknesses 206 of ice over a prospective survey area. The information for the image 200 can be obtained using satellite radiometry, Radarsat Images, MODIS, average annual total ice concentration distributions, flat ice height distributions, Hummock ice distributions or other technique or source. Ice barriers, ice thickness, and other conditions can be shown over the survey area. Review of ice conditions can show whether the survey area will be characteristic of ice that is predominantly thick first-year (TFY) ice with lesser concentrations of old ice or will be characterized with other forms of ice.

From the available information, certain areas of the survey can be determined to be easier than the others. Generally, the ice conditions can be found in some places that are harsher than other areas, and an understanding of how the ice regimes may vary and have different topographical features can be determined. In the end, careful planning and strategic execution based on that planning can help operators avoid issues because the ability to perform deployment and recovery operations in open water can be extremely limited in the given survey area.

Figure 5A:
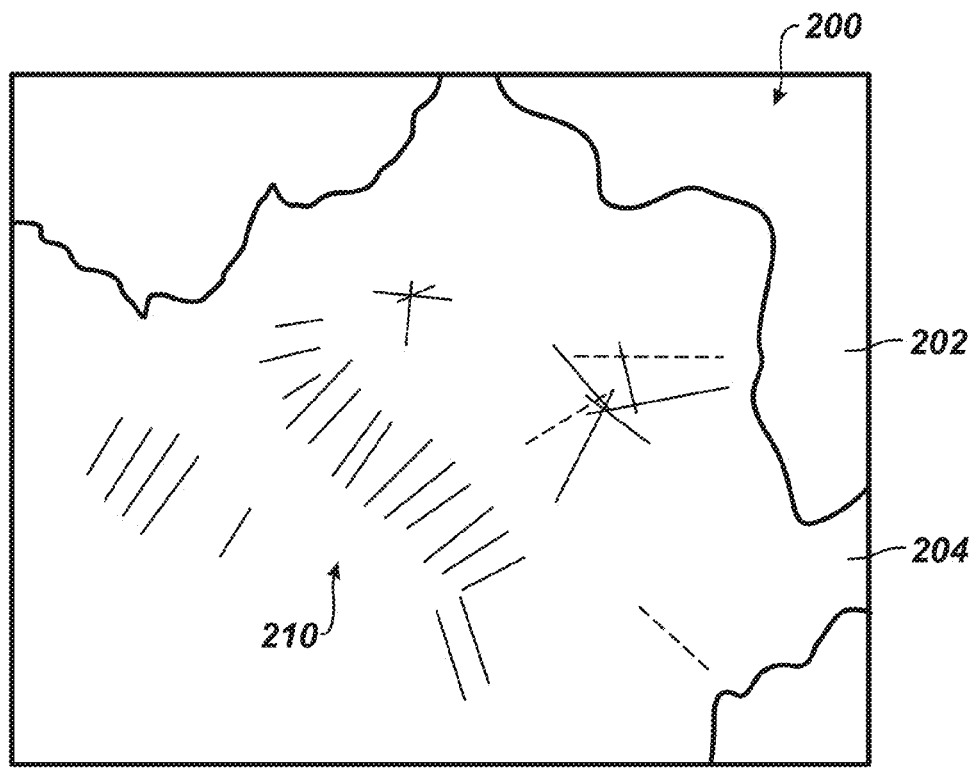
FIG. 5A diagrammatically illustrates the arctic sea region having seismic tracks planned thereon.

Within these ice conditions, operators want to survey various portions of the area so operators traverse the various survey tracks where seismic data is desired. For example, FIG. 5A diagrams an example the survey area 200 with the desired survey tracks or lines 210 laid out where seismic data is to be obtained.

Figure 5B:
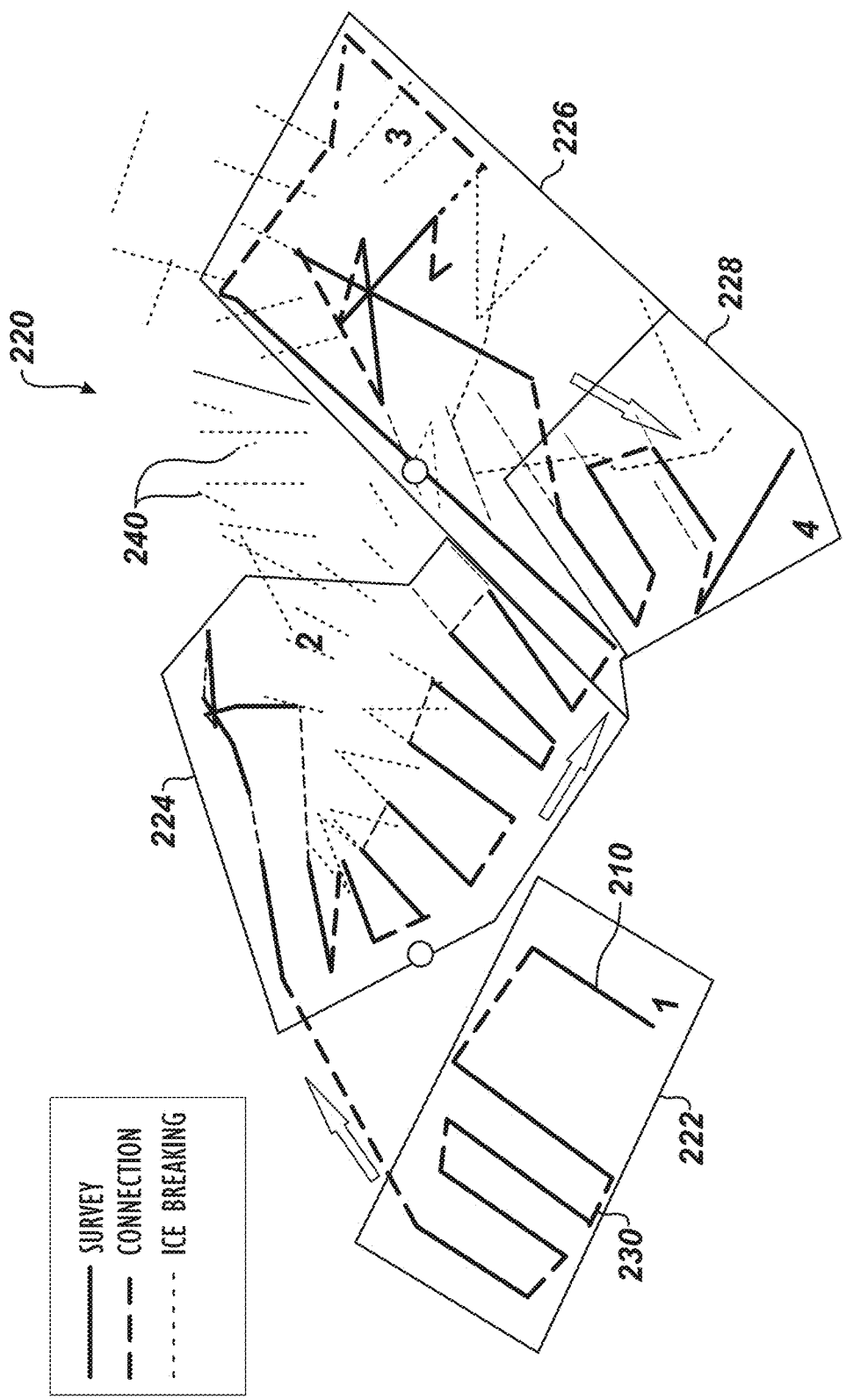
FIG. 5B diagrammatically illustrates the arctic sea region having an initial survey plan charted thereon.

Based on the analysis of the region's ice, weather, and the like and considering where survey tracks 210 are desired, operators develop the initial shooting plan having the survey tracks 210 traversing the icy region to obtain the seismic data. FIG. 5B diagrams an example of an initial shooting plan 220, which has been formulated after consideration is given to the ice regimes and weather determined from satellite imagery, ice charts, weather forecasts, ice modeling, and other information. The initial shooting plan 220 details a survey route for the escort and survey vessels 20 and 30 and shows various sections or segments of the route and the proposed order. Areas where heavy ridging, hummocking, and ice-pressure can be forecast so tactical considerations can be developed. Because various sections may traverse hard ice, experience in the field may dictate a modified plan during operations. Therefore, contingency plans can be developed with that understanding in mind.

As shown, sectors 222, 224, 226, 228 can be determined that have different ice conditions. In this example, the first two sectors 222, 224 may include most of the hardest ice to be encountered on the survey. Connecting tracks 230 are arranged between the planned survey tracks 210 and the sectors 222, 224, 226, 228 for continuous surveying. Additionally, prospective ice breaking routes 240 for the escort vessel 20 are planned and laid out relative to the tracks 210 and 230. Based on assessments of ice regimes and the like, decisions about parameters of the survey, such as shortening streamer length, are also initially planned because deployments/recoveries of the survey equipment in open water may be extremely limited in the survey area.

Although not shown in FIG. 5B, details of ice floes, weather, ice conditions, and the like have been used to create the initial shooting plan 220, and information of these details can be provided on the initial shooting plan 220 or may be separately accessible. With the various factors taken into account, the initial shooting plan 220 is preferably determined with the understanding that an ice master on the survey vessel 30 in close consultation with an ice management team and other personnel during the actual survey operations may need to make changes to the plan 220 based on current ice conditions and related operational factors.

D. Equipment

In developing the initial shooting plan 220 as discussed above, operators select and prepare the necessary vessels and equipment to conduct the planned survey, as indicated previously in Block 120 of FIG. 3. Naturally, the capabilities of the vessels and equipment must suit the particular ice regime expected in the initial shooting plan and possible contingencies that may be encountered.

1. Vessels

As noted above, the survey uses at least one escort vessel 20 and uses a survey vessel 30. These vessels 20 and 30 may need to be modified to perform the seismic survey in the icy region. The escort vessel 20 is preferably an icebreaker and may not need specific modifications to its structure. However, the survey vessel 30 may need specific modifications to conduct seismic surveys in icy waters.

The icebreaker 20 can be a diesel-powered a nuclear-powered vessel and preferably has a double hull with increased thickness at ice-breaking areas. The icebreaker 20 can also include additional features to facilitate icebreaking. For example, the hull can be coated with polymer to reduce friction. Additionally, the icebreaking capabilities can be assisted by an air bubbling system that delivers air from jets below the ice surface. Finally, the icebreaker 20 may be outfitted to carry helicopters and Zodiac boats and preferably has appropriate radio, satellite, and other communication systems. These and other factors may be considered in selecting the escort vessel(s) 20 for the survey.

For its part, the survey vessel 30 does not necessarily need to be classed as an icebreaker and can be diesel powered. However, the survey vessel 30 is preferably heavily ice-reinforced to operate in ice-dominated polar waters. For example, the survey vessel 30 may have an icebreaker bow that allows the vessel 30 to operate in an aggressive ice-breaking mode at least in first-year ice. Moreover, the survey vessel 30 can have increased plating thickness, may be doubled-hulled, and may have a low-friction hull-coating to facilitate ice-navigation. Finally, the survey vessel 30 can be propelled by any number of shafts and can be controlled by any number of rudders designed for operations in heavy ice.

Because most vessels for use in ice-dominated polar waters are not particularly suited for performing seismic surveys, the survey vessel 30 may be converted to have a semi-modular 2D or 3D ice-seismic capability. The deck of the survey vessel 30 may be modified by installing two guy arrays on the vessel's mooring deck. A seismic streamer reel can be installed aft on the vessel's weather deck. Additionally, containers can be installed on the survey vessel 30 for a seismic control room, generators, and compressors. Finally, helicopter flights may be necessary to support ice operations so both vessels are equipped with helicopters and helipads to support the operation collaboratively.

2. Ice Skeg

Additionally, the survey vessel 30 is modified by installing or is built having an ice skeg 50 on the hull of the survey vessel 30. As noted previously, the ice skeg 50 mounts on the vessel 30 (preferably on the vessel's aft or stern) and protects the passage of the towed seismic equipment from the vessel 30 into the icy waters.

Figure 6A:
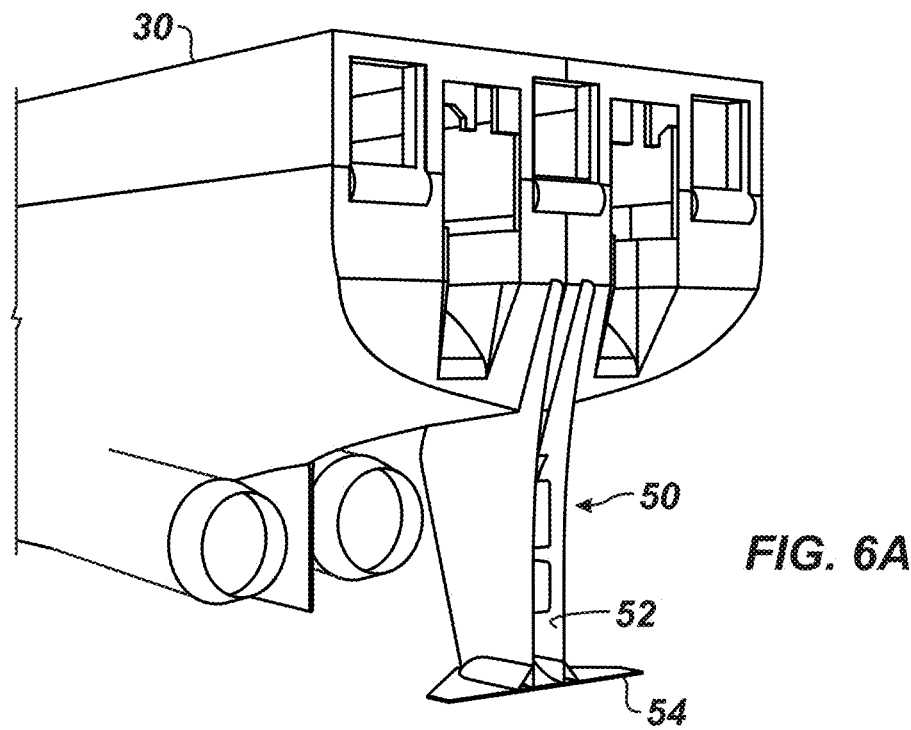
FIGS. 6A-6B illustrate two types of ice skegs for use in the disclosed system.
Figure 6B:
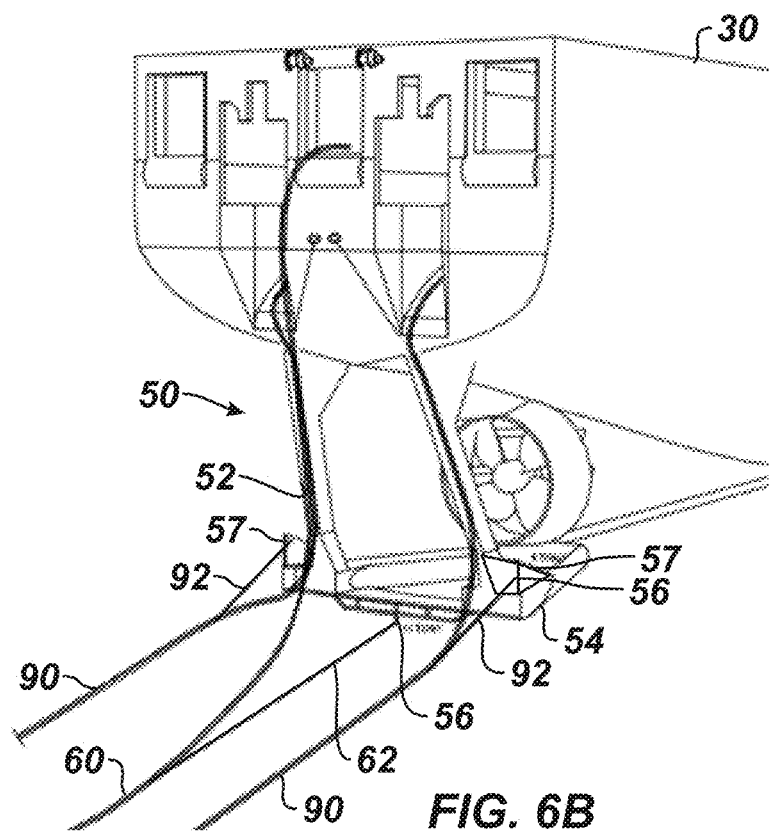

The ice skeg 50 can have different configurations. As shown, for example, in FIG. 6A, the ice skeg 50 can have a single protective passage 52 (FIG. 6A). The passage 52 is used to provide protection for the umbilicals and the lead-in cables 65 and 95 for the streamers 60 and sources 90. In FIG. 6B, the skeg 50 has multiple protective passages 52. This set up allows for full rudder performance and can help maintain the maneuverability of the survey vessel 30. Additionally, this skeg 50 in FIG. 6B can use one or more shuttle(s) 57 that can be run up and down in the skeg 50 to raise and lower the tow points 56 with each shuttle 57 being able to handle one or more tow lines for the streamers 60 and/or sources 90.

Either way, the ice skeg 50 has a base or distal end 54 providing subsea tow points 56 for the in-water equipment. Towlines 62 and 92 for the system's streamers 60 and sources 90 connect to these tow points 56. In this way, these towlines 62 and 92 deploy under the water and away from any ice floes that may be present at the water's surface. Additionally, this helps maintain the towed equipment (60, 90) below the ice and facilitates maintaining an optimum depth.

In one arrangement, the ice skeg 50 provides at least three subsea tow points 56—one on the centerline and two other winch controlled tow points. These two outer tow points 56 can be several meters to port and starboard respectively. The tow weight of the streamer 60 and air gun sources 90 can be borne by the tow lines 62 and 92 connected to these tow points 56 while the cables 65 and 95 are stowed in the passage(s) 52 of the ice skeg 50.

As discussed later, various procedures are used for operations using the ice skeg 50 along with procedures for deployment and retrieval of streamers 60 and sources 90. In general, cables from tugger winches provided on the deck of the vessel 30 are used to pull the umbilicals and the lead-in cables 65 and 95 in to the protective passage(s) 52 behind the skeg 50.

3. Streamer

As another part of the seismic system 10 for icy waters, the system 10 uses the seismic streamers 60 and a recording system. One particular type of streamer and recording system includes the DigiSTREAMER seismic streamers and recording system. The active section of the streamer 60 has hydrophones as the sensors 70 disposed along its length. The streamer 60 has a stress member chasis component of non-magnetic materail, such as Vectran®. The streamer 60 is preferably gel-filled. Solid streamers filled with foam would be expected to become stiff in colder weather, which can create undersirable issues with handling them. Metal components of the streamer 60 are preferably made of titanium for durability and corrosion resistance.

Preferably, the entire streamer 60 is preferably new so the buoyancy of the streamer 60 will be uniform and can be pre-calculated. During operations, the consistent buoyancy expected from the streamer 60 can help operators balance the streamer's buoyancy correctly to minimize contact with the ice.

The streamer 60 and recording system preferably has a continuous recording capability that can be used to create multiple recording outputs. This enable the recording of overlapping records during the survey.

Finally, the streamer 60 is fitted with depth controllers (birds) that maintain the depth of the streamer 60 while surveying. The depth controllers also provide the ability to dive the streamer 60 when close to ice keels deeper than 20 meters (or the survey depth). Cable depth control and compasses can use the ION 5011 DigiBird type of controller available from ION Geophysical Corporation. The controller mounts externally on the streamer 60 and provides compass heading information, depth measurement, and adjustable depth control to assist in ballasting the streamer 60.

Because it is used in harsh condition, the streamer 60 preferably uses streamer recovery devices, such as the SRD-500S streamer recovery devices. The recovery devices are installed at suitable intervals (600 m) along the streamer 60 and are adapted to deploy at a deeper depth (e.g., about 75-m) than conventional models to allow the streamer 60 to be depressed to a deeper depth to avoid ice keels during survey operations. If the streamer 60 is severed or becomes detached from the survey vessel 30 and sinks, the recovery devices automatically detonate at a water depth of about 75-m and releases compressed $CO_2$ into a floatation bag. After the bag inflates, the streamer 60 floats to surface for recovery.

4. Source

As another part of the seismic system for icy waters, the system 10 uses one or more seismic sources 90, which can use an air-gun array, for example. The array of the source 90 typically has multiple air guns and depth sensors. The source 90 may or may not use deflectors and floats. The seismic source 90 of the system 10 has a source controller, which can be a conventional component, and the source 90 has recording instruments, such as an IAS (Integrated Data Acquisition System).

During operations, the source 90 is directly towed from the ice skeg 50, and when no floats are used, the depth of the source 90 can depend on the vessel's speed during deployment. Other arrangements may use floats to support the source 90 submerged regardless of speed.

Figure 7:
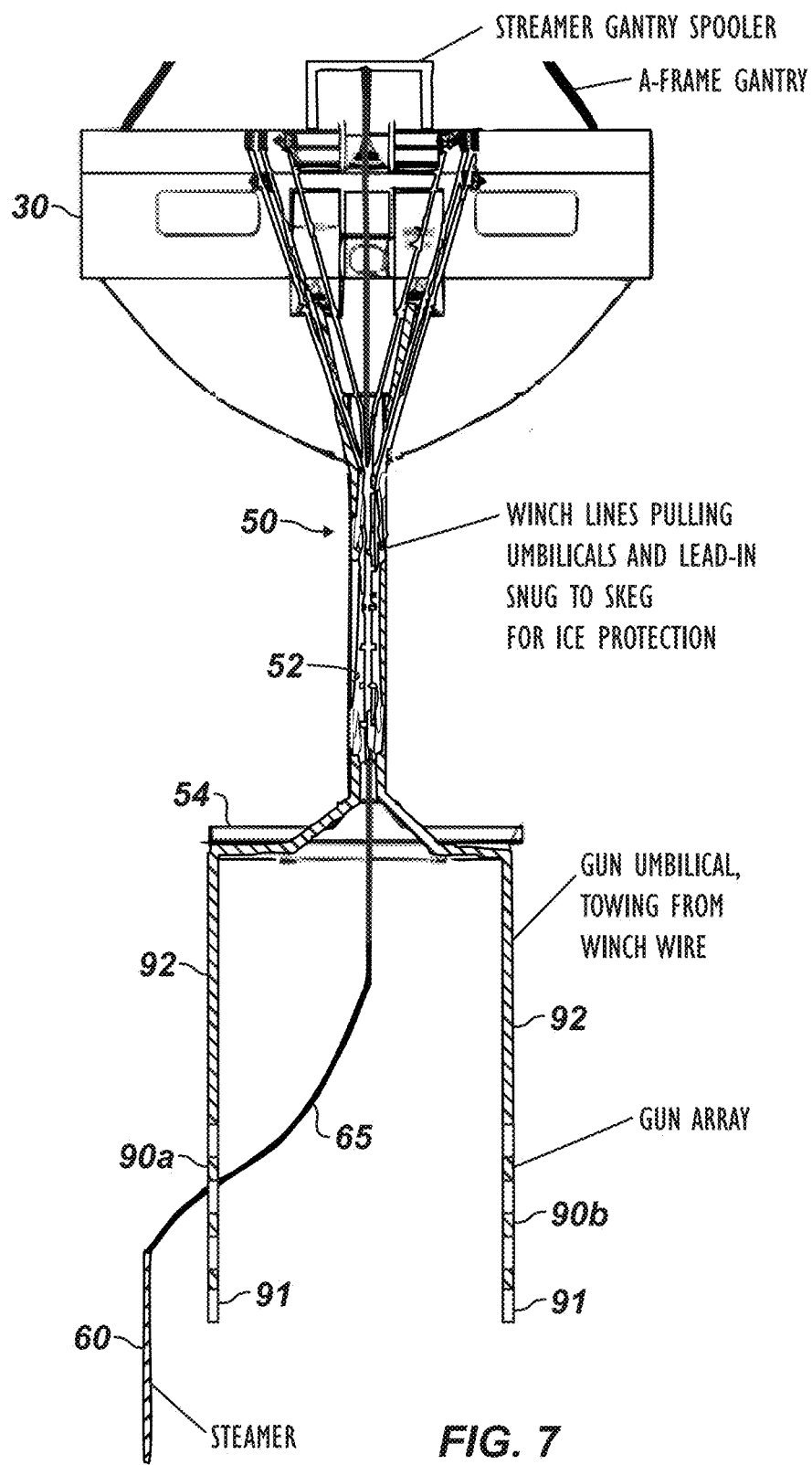
FIG. 7 illustrates a technique for deploying sources arrays from the ice skeg.

In the arrangement depicted in FIG. 7, two seismic sources 90a-b are towed close to the stern and are fitted with vertical arrays. This arrangement does not require any buoyage and avoids the challenges associated with deploying buoyage in the ice. In this arrangement, the sources 90a-b are towed submerged as angled strings close to the stern so that buoys are not required. For these vertically towed sources 90a-b, a depth transducer and other components discussed previously are mounted at the end of the sub-arrays.

The sources 90a-b are towed with a geometry that is centered over the cable axis. Each source 90a-b is towed from a fixed point on the skeg 50 that defines the location of the near gun 91. The far gun's location is either calculated from the length of the array and the Ultra Short Base-Line (USBL) vector from the ice skeg 50 to the last gun 91. Also, each source 90a-b has an inline air pressure transducer preferably at the farthest end of the array's air supply.

Alternatively as noted previously, the seismic source 90 can use floats or buoys to deploy the gun array horizontally under the surface ice, such as discussed with reference to FIGS. 2A-2B. For such a horizontally towed source 90, at least two depth transducers are attached to the array, one transducer mounted at each end for monitoring and recording gun depths. The source 90 can then be towed from a fixed point on the skeg 50 that defines the location of the near gun 91. The far gun's location can then be readily calculated based on the length of the gun array of the source 90.

5. Additional Systems

In addition to the above-equipment, the escort and survey vessels 20 and 30 are fitted with additional equipment. For example, the survey vessel 30 may have additional equipment for handling the seismic components, recording data, and controlling seismic operations. These components can be conventional components used in marine seismic surveying.

Figure 8:
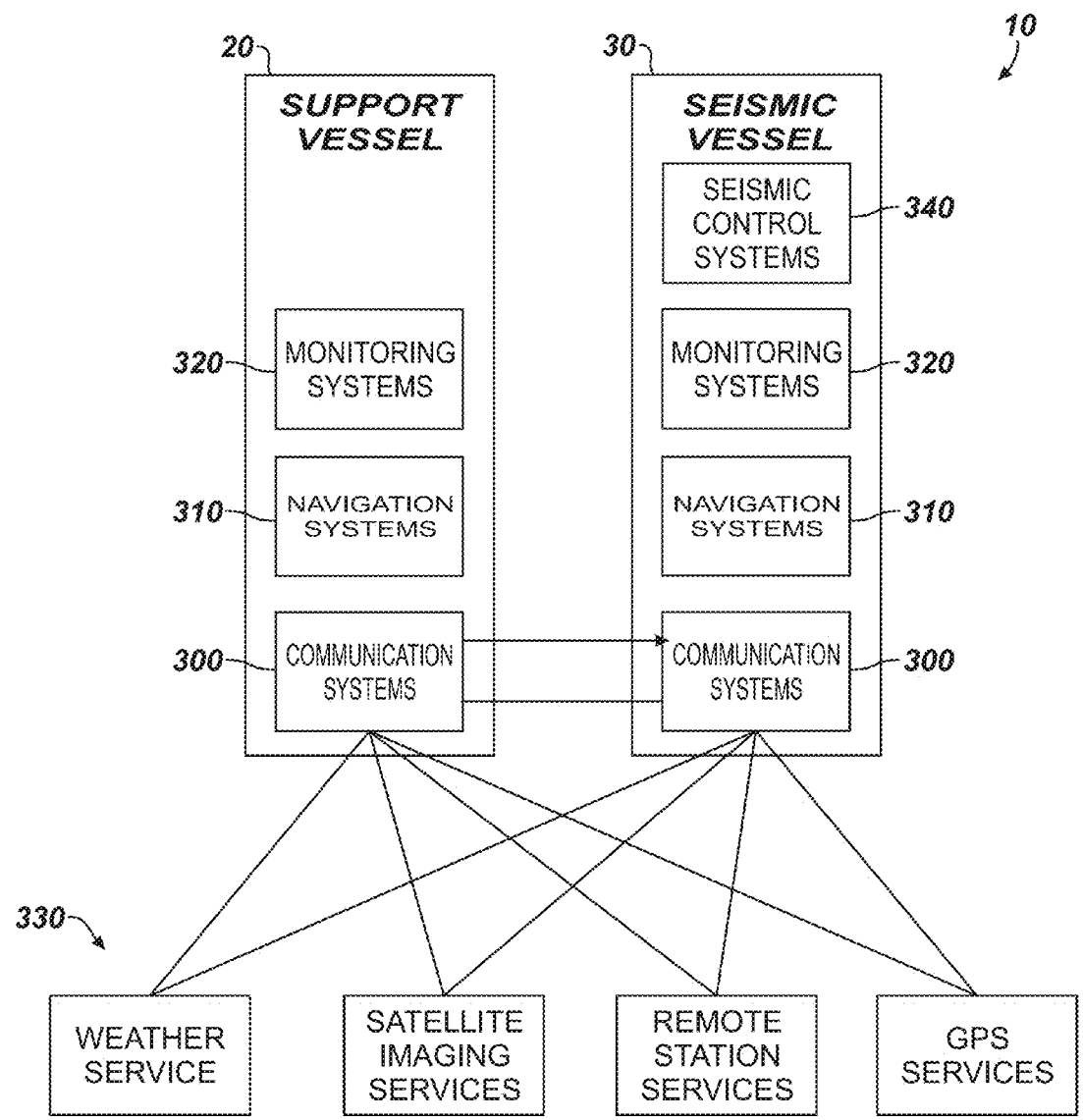
FIG. 8 schematically illustrates various systems of the vessels for the seismic surveying.

Furthermore, the vessels 20 and 30 are outfitted with communication systems 300, navigations systems 310, monitoring systems 320, and the like, as shown in FIG. 8.

a. Communication Systems

For the communication systems 300 in FIG. 8, the vessels 20 and 30 can be outfitted with a multi-vessel radio system for communications between the vessels 20 and 30 of the seismic system 10. An example radio system is the Concept Systems Multi Vessel Radio (MVRS) System. The radio system uses multi-vessel wireless communications equipment that allows the icebreaker 20 to access all of the display options for the streamer 60 available on the survey vessel 30.

Additionally, multiple communication systems 300 can be used for vessel-to-vessel communications, including the normal merchant marine systems of VHF and SSB radios provided by GMDSS equipment. The communications systems 300 used are suited for use at high latitudes encountered in the arctic. For example, both vessels 20 and 30 preferably have a satellite communication system, such as an Iridium Open Port unit, to provide a two boat link that can be used for voice and for electronic communications (i.e., email and file transfers). The two boat link or Multi-Vessel Radio System (MVRS) are installed mainly to support the inter-ship communications and communication with external sources of information, such as weather images, satellite images, etc., for the vessels' ice navigation systems.

The vessels 20 and 30 also use a ship-to-shore communication system 300 capable of digital file transmission, voice telephone communications and email services. The communication systems 300 preferably provide multiple display options to operators on both vessels 20 and 30 and can show lateral streamer shapes and cable depths.

b. Navigation and Monitoring Systems

In addition to the communication systems 300, both the icebreaker 20 and the survey vessel 30 are fitted with navigation systems 310 to navigate the survey track in the icy waters. Both vessels 20 and 30 also have monitoring systems 320 for monitoring ice conditions, weather, and other information to be monitored. Information from these systems 310 and 320 can be obtained from various sources 330, such as weather services, satellite imaging services, remote stations, GPS services, and others.

The navigation systems 310 preferably use near real-time imagery or interpretations with additional real-time or near real-time radar overlays. Additionally, each vessel 20 and 30 can preferably view and use the radar imagery of the other vessel 20 and 30. The navigation systems 310 incorporate ice hazard radar features, such as available from Sigma Radar Processing. This enhances ice navigation and the capability to detect old ice.

Using an Ice Regime Operating System, weather programs, ice programs, and the like, the navigation and monitoring systems 310 and 320 permit the ice navigator to make ice assessments based on available information. These systems can be used as a baseline guide for navigation in the ice regimes encountered there. The systems can also be used for mathematical computations conducted by operators, such as the ice navigator or ice pilot.

In particular, the vessels 20 and 30 are supported by ice and weather programs that automatically obtain periodic and regular ice imagery, ice imagery interpretations, weather information, and similar information. Each of the vessels 20 and 30 in the operation is provided automatically with this information. At the tactical level, the vessels 20 and 30 can request custom satellite imagery, and the resolution and area of interest can be tailored to the requirements. In addition to imagery or weather forecasts, professional interpretation of the data can also be obtained from the external sources 330.

The information from the sources 330 provides the vessel's weather program with weather forecasts, prognosis, and outlooks and provides the vessel's ice program with ice imagery, ice analysis, and ice charts complete with ice drift modeling. As noted above, useful information includes geotagging images; ice condition maps; prediction surface pressure fields; meteorological forecasts; ice floe compression forecasts; ice drift forecasts; forecasts of localization and move of breaks in ice floes; wave forecasts for ice-free waters; ice aerial reconnaissance; ice depth measurements; AES images; ice maps; and ice forecasts. The information is provided in compatible formats and resolutions and with desired frequency (e.g., one or more times a day and night, as needed, etc.).

Finally, the survey vessel 30 has seismic control systems 340 for obtaining seismic data, controlling the seismic system's operation, and monitoring the system's performance. The escort vessel 20 may be able to access information provided by the seismic control systems 340 so that the escort vessel 20 can determine the position of streamers 60 towed behind the survey vessel 30; determine the speed, location and direction of the survey vessel 30; and monitor other useful information.

Many aspects of the seismic control systems 340 can be similar to those systems typically used in conventional marine seismic surveys. However, because the seismic system 10 for use in icy waters has additional elements, the seismic control systems 340 have additional control and monitoring features, such as disclosed in the incorporated U.S. patent applications.

E. Survey Operations

Once the initial shot plan (220: FIG. 5B) is determined and the equipment is ready, operators can begin the planned seismic survey by taking the equipment out to the start of the planned track, as noted previously in Block 150 of FIG. 3. When the survey vessel 30 leaves the shipyard, all the rigging is installed and secured in transit positions. Then, the seismic streamer(s) 60 and source array(s) 90 are deployed in an area of open water (i.e., water free of ice floes and the like) near the starting position of the shot plan 220. After being deployed, the inactive lengths of the source cables 95 and streamer cables 65 are stowed in the protective housing of the ice skeg 50. When this is completed, the survey vessel 30 can enter the icy waters. In all instances, the survey vessel 30 preferably does not enter the icy waters unless the cables 65 and 95 are protected in the ice skeg 50.

1. Deployment Procedures

Various rigging arrangements and procedures can be used for the deployment and recovery of the towed equipment. As discussed below, the seismic streamers 60 are deployed first and the seismic source(s) 90 are deployed afterwards. In the present discussion, only one streamer 60 is discussed for deployment. Deploying multiple streamers 60 can use the same procedures for each and can further involve procedures for individually manipulating the streamers 60 once deployed as disclosed in the incorporated U.S. patent applications.

a. Deployment of Streamer

Figure 9A:
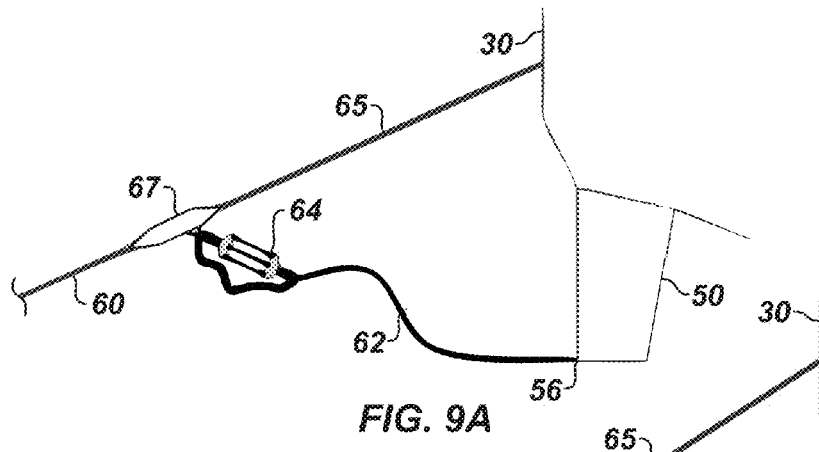
FIGS. 9A-9D diagram how a seismic streamer is deployed from the survey vessel and protected in the ice skeg.

Although deploying the streamer 60 can use some conventional steps, the deployment calls for connection of a skeg towing wire and associated containment cables to stow the streamer 60 in the ice skeg 50. As shown in FIG. 9A, operators deploy the streamer 60 using a lead-in line 65 and containment ropes (not shown). Operators connect the lead-in line 65 to the ice skeg 50, and a bend restrictor 67 on the lead-in line 65 connects to a fixed towing cable 62 attached to a tow point 56 on the skeg 50. A soft tow arrangement 67 can be used between the fixed towing cable 62 and the bend restrictor 67.

Figure 9B:
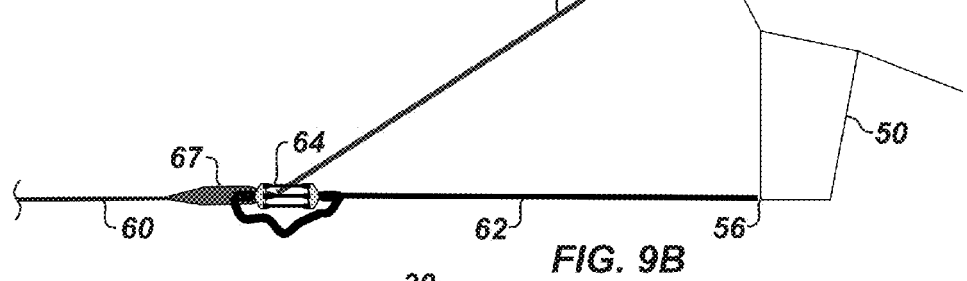
Figure 9C:
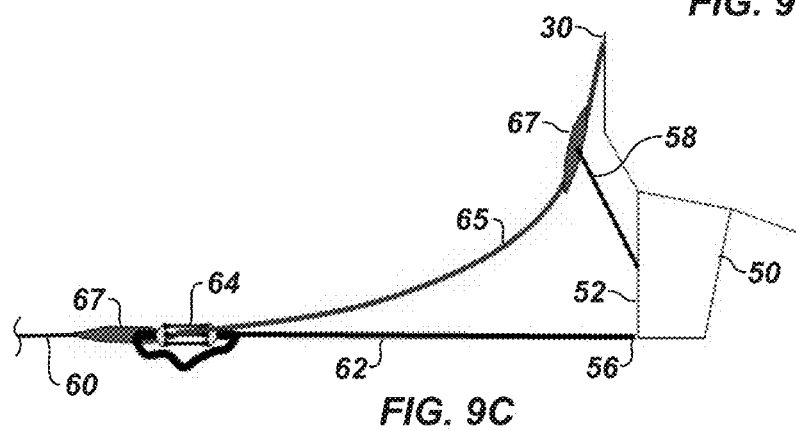
Figure 9D:
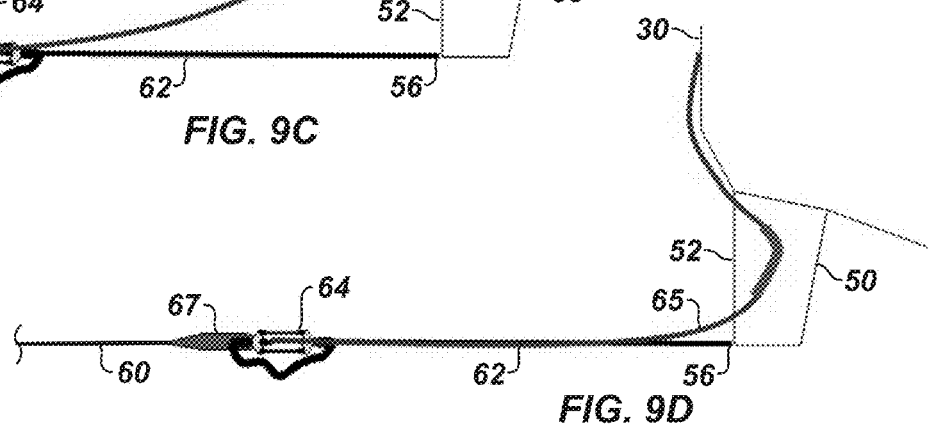

As shown in FIG. 9B, the streamer 60 and lead-in line 65 are paid out, and the fixed towing cable 62 is put under stress by paying out the lead-in line 65. As then shown in FIG. 9C, pulling lines 58 are connected with bend restrictors 67 or Chinese fingers to the lead-in line 65, and the pulling lines 58 are used to pull the lead-in line 65 into the skeg's internal channel 52. The restrictors 67 restrict the bend angle on the lead-in line 65 and the umbilical as they are pulled in to the skeg 50. Finally, as shown in FIG. 9D, the lead-in line 65 is disposed in the skeg 50 to be protected from ice running alongside or under the vessel 30.

As noted previously, the position of the deployed streamer 60 can be controlled in a number of ways. For example, the streamer's depth can controlled by depth controllers or birds (e.g., the ION 5010 DigiBirds) spaced at intervals along the length of the active streamer 60. The streamer's horizontal position can be controlled by devices or birds. Additionally, the streamer's horizontal position can be measured by devices or birds (e.g., the ION 5011e compass birds) spaced at intervals along the length of the active streamer 60.

An active tail buoy may or may not be used on the end of the streamer 60. However, a tail drogue can be fitted on the tail of the streamer 60 to maintain stability at the far end of the streamer 60. Depth transducers are deployed along the streamer 60, and the streamer 60 is ballasted for neutral buoyancy at the beginning of the survey. This balancing is accomplished with depth controller angles set to zero. While in operation the streamer 60 is ballasted to a predetermined depth, the depth controllers are placed in a depth-keeping mode. As conditions change, the wing angles of the depth controllers are changed to control the depth, and the streamer's depth controllers are controlled manually or automatically during the recording time.

b. Deployment of Source Arrays

Once operators ensure that the streamer(s) 60 are fully deployed and that the lead-in lines 65 are located in the channel 52 of the ice skeg 50 as described above, operators can begin deploying the source(s) 90. During deployment, the guns 91 on the source 90 sink quickly under the water's surface so that they are not visible for the majority of the deployment. Eventually, the source cables 95 dangle straight down behind the vessel 30 once the sources 90 are deployed and the vessel 30 maintains forward motion.

As noted above in FIG. 7, for example, the vessel 30 can uses two seismic sources 90*a-b*—one at the port side and the other at the starboard side of the survey vessel 30. The procedures for deploying each of these sources 90*a-b* are essentially the same for both. In general, the survey vessel 30 uses several winches for handling snugging wires, collars, winch wires, the gun arrays, and the like during deployment and recovery. The snugging wires, collars, winches, and the like are used to ease the source 90*a-b* aft of the vessel 30. Because each source 90*a-b* is deployed separately, multiple ones of the winches are available to maneuver the one source 90*a-b*. The source 90*a-b* is completely deployed when a predetermined mark on the source's cable 95 is reached. Finally, the umbilicals and lead-in cable 95 of the source 90*a-b* can be pulled snug into the skeg 50 for ice protection similar to the procedures for the streamers 60.

2. Surveying, Icebreaking, and Escort Distances

With the equipment deployed and the survey vessel 30 escorted to the icy waters by the icebreaker 20, operators take the survey vessel 30 to the starting point of the planned track and begin conducting the seismic survey, as noted previously in Block 150 of FIG. 3. To do this, the icebreaker 20 and survey vessels 30 traverse the planned survey line through the icy region. As noted above, the vessels 20 and 30 operate together as a system in the ice so the vessels 20 and 30 operate together using the communication, navigation, monitoring, and other systems 310, 320, 340, etc. to continuously navigate the vessels 20 and 30 in the various ice regimes encountered.

To physically manage the ice, the support vessels, such as the icebreaker 20 or any other escort vessel(s), fragments and/or clears potentially hazardous ice features as required. Because the region changes dynamically and has a number of potential dangers and impediments, operators continually monitor for threats, manage ice, modify the track if necessary, and handle emergencies.

Preferably, the encountered ice regimes have no more than 10/10 coverage of first year ice, but this may not always be possible. For example, the vessels 20 and 30 can operate in harsher ice regimes including some concentrations of multi-year ice, but the vessels 20 and 30 preferably avoid heavily ridged ice, especially ice having old ice inclusions and ice under pressure. In any event, the size of ice floes as well as other topographical features need to be monitored and considered when traversing the planned track.

To support the operation, the vessels 20 and 30 are supported by ice and weather programs, as noted above. Periodic and regular ice imagery, ice imagery interpretations, and weather information are provided automatically to all of the vessels 20 and 30 in the operation. At the tactical level, the vessels 20 and 30 can request custom satellite imagery, and the resolution and area of interest can be tailored to the requirements. In addition to imagery or weather forecasts, professional interpretation of the data can also be obtained from external sources.

As noted previously, both the icebreaker 20 and the survey vessel 30 are preferably fitted with ice navigation systems 310 to navigate the survey track using near real-time imagery or interpretations with additional real-time or near real-time radar overlays. Additionally, each vessel 20 and 30 can view and use the radar imagery of the other vessel 20 and 30. The ice navigation system 310 can incorporate ice hazard radar features, such as available from Sigma Radar Processing. This enhances ice navigation and the capability to detect old ice. The ice navigation systems 310 onboard both vessels 20 and 30 preferably incorporate the features of Ice Hazard Radar. Furthermore, an ice and weather informational support program supports survey operations.

During the survey, GPS devices are used to determine the location of the vessels 20 and 30. Conventional seismic practices related to GPS quality control can be practiced. For example, two independent navigation solutions are preferably used and compared to verify positioning of the vessels 20 and 30. In particular, the real-time geodetic accuracy of the navigation systems 310 can be verified in the following manner. The accuracy of the GPS satellite position is determined by reference to two criteria, namely PDOP (Position Dilution of Precision) and HDOP (Horizontal Dilution of Precision). For PDOP, the allowable limit on any line is 5 (five), and the overall mean may be configured to not exceed 2.5 (two point five). For HDOP, these limits are 4 (four) and 1.5 (one point five). respectively. The difference between the positions of the primary system versus the secondary system is generally configured not to exceed an RMS value of 5 meters provided both systems are functional.

For the seismic control systems 340, compasses are deployed along the streamers 60. A modelled magnetic grid (WMM or EMM) can be entered into the navigation systems 310. Then, the spatially variant declination for all compasses on the streamers 60 can be applied during post-processing of the data. Additionally, depending on the ice conditions, the cable depth of the streamers 60 and sources 90 may be adjusted deeper while working in ice if the cable safety is in question or if the cable is taking occasional ice strikes.

As is typically done, the navigation systems 310 can be integrated with the other monitoring and seismic control systems 320 and 340, and the raw data from these systems can be recorded, including but not limited to all GPS positions (ephemeris and Rinex), compass headings, streamer depths, and water depths. Time stamping is applied to the recorded data for later compilation and analysis.

Finally, to manage the ice in addition to the above systems, operators also use weather and ocean observations on both regional and local scales, as well as forecasts of certain weather and sea parameters, and reports from the vessels 20 and 30 about ice conditions in the local area and their performance in these conditions. The range of ice-related support activities that are outlined above are implemented as an integrated system.

Weather conditions including wind, visibility, waves, local weather, and sea state conditions can be considered when assessing ice-seismic operations. Wind is a prime mover of pack ice, and the speed, direction, and variability of the wind can affect the distribution, concentration, and movement of pack ice in the survey line. Waves play a significant role in relation to ice floe sizes and deterioration. In addition, the motion of ice in waves, especially when in opposition to the motion of the vessels 20 and 30, can increase impact forces and, in some high sea situations, can give rise to high ice impact loads on lesser strengthened hull plating, particularly above or below an ice belt. Reductions in visibility due to fog, precipitation, and darkness can seriously restrict the effectiveness of ice management operations and increase the dependence on ice imagery. To be effective, the vessel maneuvering speeds used for most pack ice management techniques are generally high.

As the vessels 20 and 30 travel together under the expected and observed conditions, the icebreaker 20 breaks a track for the survey vessel 30 in pack ice conditions when the survey vessel 30 is surveying. As will be appreciated, the survey vessel 30 is not operated astern in the ice because the ice skeg 50 can be damaged. Therefore, the icebreaker 20 breaks the track for the survey vessel 30 so the survey vessel 30 is able to continuously proceed at a survey speed along the survey line. Because the survey vessel 30 must continue to make forward progress when towing the streamers 60 and sources 90 and acquiring data, the escorting icebreaker 20 needs to execute ice management effectively while maintaining close and continuous communications with the survey vessel 30.

As the vessels 20 and 30 traverse the track, for example, operators manage the ice using communications and a team approach. Various personnel on the two vessels 20 and 30 maintain contact with one another to manage ice and perform varying decision-making and collaborative roles depending on the ice conditions. In particular, an ice management team is headed by an ice master on the survey vessel 30. The team also includes the ship masters of both vessels 20 and 30 as well as the two ice pilots onboard the Icebreaker 20.

The team maintains open and ongoing communications throughout the survey to determine recommended areas of operation and to review the ice operations. The ice master, in consultation with others, recommends the selection of planned survey lines and any modifications to the initial shooting plan. Yet, at any point during operation, any member of the ice management team may have the authority to terminate a survey line due to the actual ice conditions encountered. The ice master also gives recommendations about diving the streamers 60 for ice defense.

While conducting the seismic operation, the escort distance between the icebreaker 20 and the survey vessel 30 may be initially planned. To reduce seismic noise, the escort distance is as great as circumstances realistically permit without compromising the safety of the operation. The icebreaker 20 in general clears the track for the survey vessel 30 while compensating for the escort distance and the set and drift of the ice. Continual communication between the vessels 20 and 30 involved can maximize the effectiveness of this.

In any event, noise levels while operating in ice and while in close escort with the icebreaker 20 will be unrestricted due to the unknown noise profiles of the ice, increased or unknown streamer and vessel acoustic signatures while pushing ice, and the traditionally high noise levels generated by the icebreaker 20. As the vessels 20 and 30 travel, the distance between the icebreaker 20 and the survey vessel 30 is therefore monitored to maintain a preferred distance to minimize noise that can interfere with the survey data. In general, it is preferable to maintain an escort distance of three cable lengths or more to mitigate issues with noise when the icebreaker 20 manages the ice.

At times, conditions may exist in the ice that require the icebreaker 20 to range several miles ahead of the survey vessel 30. In other ice regimes, the icebreaker 20 may only need to deal with strips, patches, and similar ice concentrations ahead of the survey vessel 30 and can maintain a shorter escort distance ahead of the survey vessel 30. Yet, the vessels 20 and 30 must operate with distances that would prevent the survey vessel 30 from stopping in the ice so the escort distance may vary during operations.

Unlike strict commercial icebreaker escorts where the entire operation is controlled by the icebreaker 20, control of the seismic operation needs to be shared between the two vessels 20 and 30. As noted above, for example, a particular escort distance may be required between the survey vessel 30 and the icebreaker 20 to reduce noise interference and other adverse effects. The operators on the survey vessel 30 are best suited to monitor this distance. Since they need to also maintain a survey speed, they may need to continually convey to the icebreaker 20 the need to increase the icebreaker's escort distance from the following survey vessel 30.

On the other hand, the survey vessel 30 also needs to communicate the ice conditions it is encountering while following the icebreaker 20, such as communicating the ice loads encountered, glacial ice, etc. The icebreaker 20 can then modify its operations to improve the conditions encountered by the survey vessel 30 by breaking or dispersing ice differently.

At the same time, the icebreaker 20 constantly considers the ice ahead and must keep full reserve power available in case of encountering heavy ridges or hummockfields. This may mean that the icebreaker 20 runs at time with its center screw in reverse in order to address energy management. The survey vessel 30 similarly maintains full reserve power readied to successfully navigate during the escort.

3. Ice Management

As discussed previously, the vessels 20 and 30 manage the ice encountered along the shooting plan. Ice management is a complex subject due to the dynamic factors involved, such as the capabilities of the survey vessel 30 being supported, the capabilities of the support vessel 20 being used, and the various ice conditions that may be encountered. For instance, pack ice and pack ice having both old ice and glacial ice may be encountered in various concentrations over the survey area. Therefore, the survey operations in the area are planned and executed so that the abilities of the vessels 20 and 30 are not exceeded. To do this, the ice conditions ahead of the vessels 20 and 30 are comprehensively determined beforehand as noted previously, but the ice conditions are also monitored during the survey as noted herein so that the icebreaker 20 and survey vessel 30 can negotiate the conditions without incurring ice-stoppages. Detailed information about the ice is required to support this approach. As noted herein, the required information is obtained from various ice charts, ice pressure forecasts, ice drift analysis, forecasts, and imagery, including high resolution images to 100 to 150-m resolution.

The vessels 20 and 30 avoid heavy pack ice and, where necessary, operate at slow advance speeds appropriate to the ambient ice conditions. When conditions permit, the vessels 20 and 30 can manage ice by breaking up or diverting pack ice moving towards the survey line to effectively defend the survey vessel 30 and the towed equipment from the approaching ice. To manage the pack ice, the icebreaker 20 aggressively breaks ice at high speeds, especially if the ice drift is fast and the encroaching pack ice features are severe or poorly defined. Also, the icebreaker 20 may need to push large ice floes at high power.

Although the characteristics encountered can be very dynamic in nature, some key pack ice management considerations can be outlined. As used herein, ice management refers to the support activities required so the survey vessel 30 can maintain its track on the survey line and continue operations in moving ice. For example, ice management includes the following range of tasks, all of which are intended to increase the safety and efficiency of survey operations in ice: ice monitoring and forecasting; ice hazard detection and tracking; ice alert and ice-team management;

and icebreaking and/or clearing (including iceberg towing), as required, to physically reducing the threat of potentially hazardous or operationally restrictive ice interactions with the vessel 30.

By carefully managing the ice conditions, the icebreaker 20 seeks to modify the ice environment up-track of the survey vessel 30. The icebreaker 20 removes hazardous or restrictive pack ice interactions from the survey vessel 30 and its towed equipment (60, 90, etc.). In managing the ice, the icebreaker 20 reduces the ice loads on the survey vessel 30 so the survey vessel 30 can continuously navigate and keep the survey line. In doing this, the icebreaker 20 clears the pack ice around the survey vessel 30 while not becoming entangled in the survey equipment (60, 90, etc.).

The ice management can be divided into two basic procedures, which include icebreaking and ice dispersal. In icebreaking, the icebreaker 20 breaks up large floes or high concentrations of mobile pack ice into small pieces. The resulting broken ice can then flow around the survey vessel's hull, while the ice skeg 50 protects the deployed cables and lines for the streamers 60 and sources 90. This also reduces the ice loads on the survey vessel 30. In ice dispersal, the support vessel 20 breaks and spreads out large floes by using high speed maneuvers and/or propeller wash.

Various ice breaking patterns can be used to clear ice so that survey vessel 30 can traverse the survey track. As shown in FIGS. 10A-10D, these patterns include linear, sector, circular, and pushing techniques used in moving pack ice. In addition to these techniques, there are a number of variations and combinations that are effective in certain ice situations. Variations and combinations of these techniques along with conventional icebreaker escort techniques may be driven by the current ice regime and other considerations.

Figure 10A:
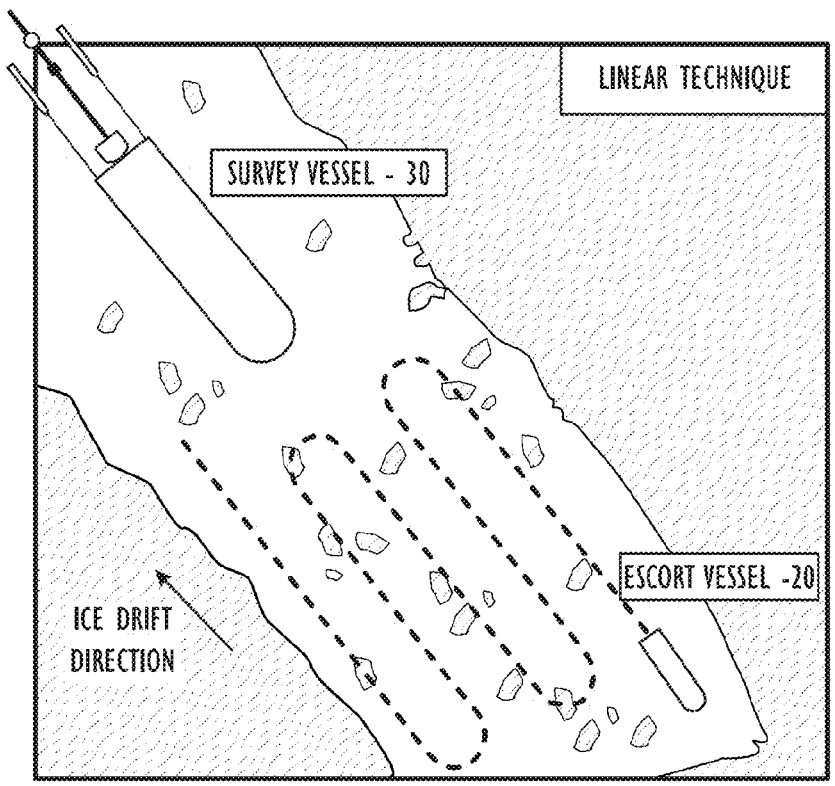
FIGS. 10A-10D illustrate techniques for dealing with ice in the survey area by the escort vessel to clear the seismic survey track for the survey vessel.

As shown in FIG. 10A, a linear technique is an icebreaking pattern used by the escort vessel 20 to break pack ice up-drift of the survey vessel 30 in straight lines, parallel to the direction of ice drift. This icebreaking pattern is typically used when the ice drift speed is fast and the ice drift direction remains reasonably constant.

Figure 10B:
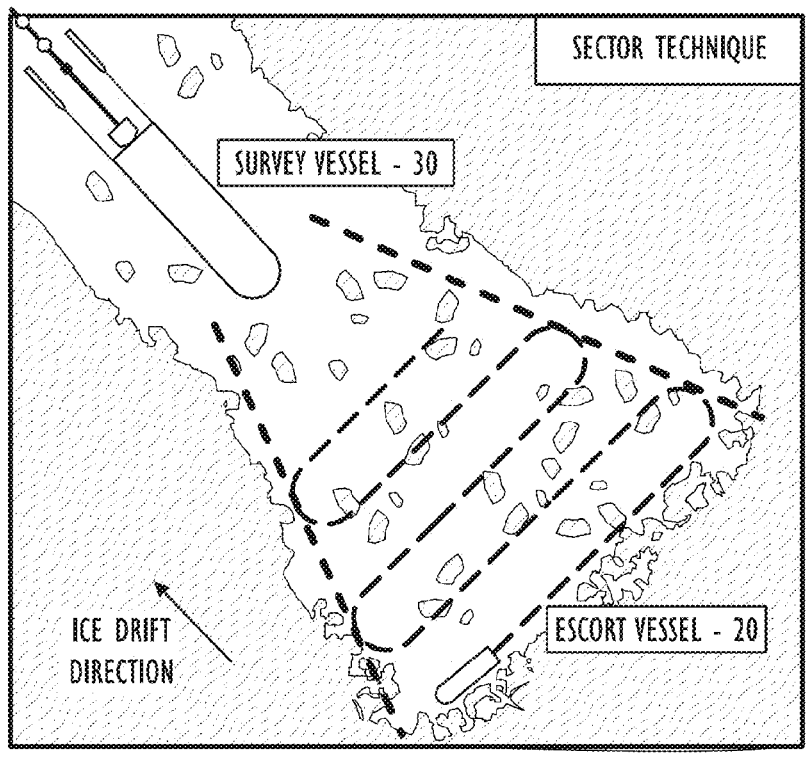

As shown in FIG. 10B, a sector technique is an icebreaking pattern that provides wide managed pack ice coverage around the approaching ice drift direction. This technique requires the escort vessel 20 to steam back and forth across the drift-line between two designated bearings that create the sector. This pattern is typically used when ice drift speed is slow and/or when the drift direction is variable or changing rapidly.

Figure 10C:
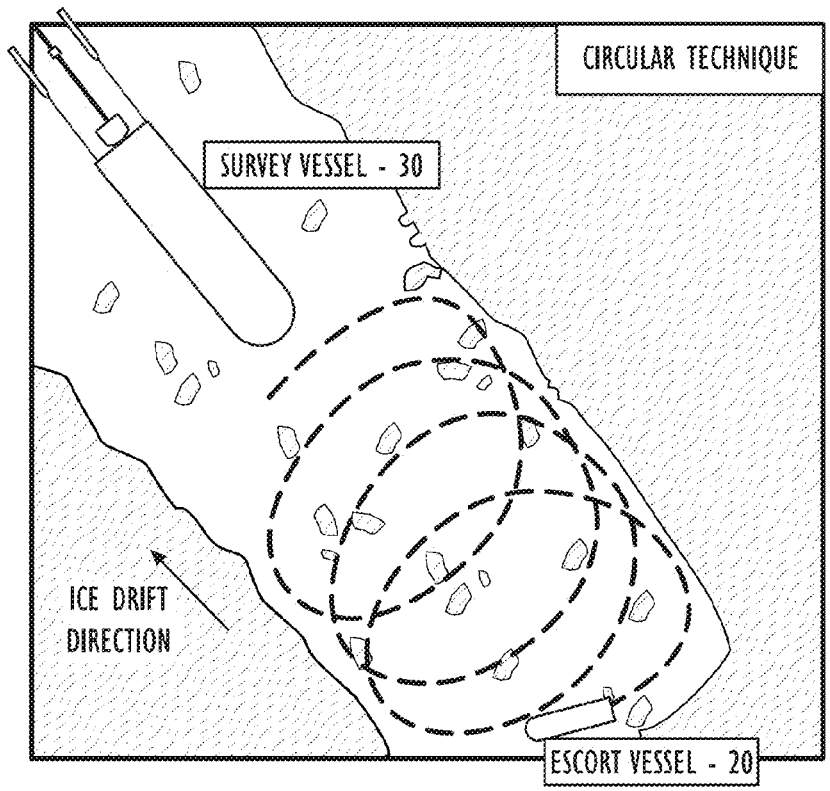

As shown in FIG. 10C, a circular icebreaking technique is a procedure that requires the escort vessel 20 to steam in a circular pattern up-drift of the survey vessel 30. The diameter of the circles will vary with the speed of the ice drift, and the maneuverability and speed of the support vessel 30. This pattern is typically used in high concentrations of thin ice or small diameter thick ice floes and when the ice drift direction is variable. A circular pattern can also be made completely around the survey vessel 30 as an effective method to relieve ice pressure, provided the streamers 60 and other deployed equipment 90 are not interfered with.

Figure 10D:
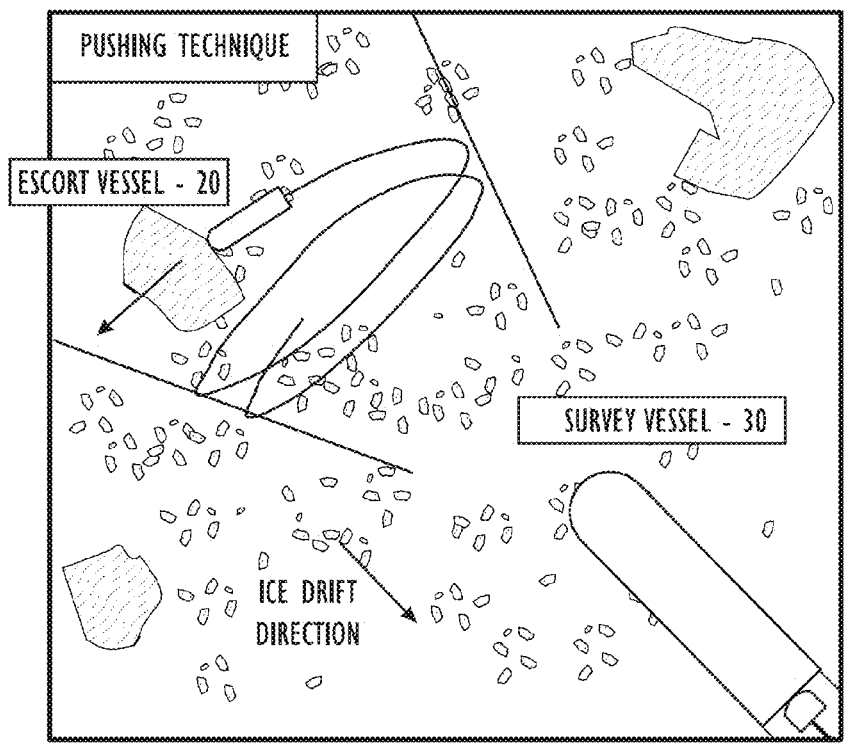

As shown in FIG. 10D, pushing ice is an effective way of removing medium and large ice floes from the drift line. The pushing direction is usually at right angles to the approaching ice. The benefit of pushing a large floe instead of breaking it is that the threat is removed from the drift-line and the survey vessel 30, whereas if the ice is broken up-drift, the broken remnants may still pose a threat. Therefore, the technique should properly forecast any change to the ice drift to ensure that the ice will not become a threat at a later time.

In addition to pack ice, glacial ice can also pose a threat to the survey vessel 30 in the survey area. Should this situation arise, the survey may need to be stopped when an iceberg poses an unacceptable risk to the survey vessel 30 or the seismic streamers 60. Notably, the set and drift of an iceberg can be different than that of the surrounding ice field because the iceberg is driven by currents while pack ice tends to be driven by wind forces.

Small glacial pieces calved from a main iceberg, such as growlers and bergy bits, may also be in the surrounding area. In some circumstances, these small ice pieces can be difficult to identify in pack ice, particularly in poor visibility conditions. Any contact made by the vessel 30 with a low ice class could result in serious damage.

4. Set, Drift, and Deviation

Because the proposed survey line passes through ice traveling in the water, the track by the icebreaker 20 accounts for the set and drift of the ice relative to the survey vessel 30 and the survey line as appropriate. For example, the track for the icebreaker 20 may range from nearly no deviation of the icebreaker 20 from the survey line while under close escort to greater deviation when ranging further ahead or afield. While the vessels 20 and 30 are operating, close communications are maintained, and all the while operators give consideration to the prevailing and probable ice conditions. As they move through the track, both vessels 20 and 30 also manage their reserve propulsive power to ensure power is immediately available should heavy ridges or other ice features require immediate increases in power to break the ice (without incurring stoppages).

Preferably, the survey vessel 30 does not deviate from the planned survey line so the desired seismic data can be obtained. Yet, deviations from the survey line may occur when necessary due to the ice conditions. When deviating from the survey line, small changes to the track are preferably made early in the deviation. For example, rates of turn of approximately 3 to 4 degrees per minute are preferably made early in the course deviation of the survey vessel 30 because more rapid changes can compromise data acquisition. Of course, a sharp change in direction may ultimately be needed to prevent damage and to avoid a stoppage in ice.

When transitioning the survey from one track to another, the seismic streamers 60 are preferably driven to a predetermined depth to reduce the risks of encountering ice and to help transition to the next line. Diving the streamers 60 is performed even in first year ice that is fairly level because there is always the possibility that deep keel ice is present and has escaped observation.

In one example, the seismic streamer 60 may be normally deployed at −28 M. Yet, ice keels may extend up to −35 M in some cases. Therefore, diving the streamer 60 deeper to approximately −55 M can reduce the risk of the streamer 60 engaging a deep ice keel. As noted above, the depth of −55 M assumes a survey depth of −28 M. If a smaller survey depth is being used, such as at −20 meters, then dangerous ice keels may be rarer and sail heights can then be considered acceptable when only 4 meters. The seismic source 90 should be appropriately handled during line changes whenever possible so that gun recovery and redeployment in heavy ice can be avoided.

The set and drift of pack ice, bergs, and individual floes are constantly determined using manual and ARPA radar plotting techniques, ice navigation, and other viable methods to maintain a constant log of the set and drift encountered.

In turn, the set and drift of the ice determines the biasing of the icebreaker 20 and identifies ice features of interest. Because the survey vessel 30 is towing the streamers 60 that can be as much as 6-km in length, ice features up drift of the survey line and the icebreaker's track are of particular interest. During the escort, a sector is maintained to reduce the risk of ice keels that can impact the seismic streamers 60.

As noted above, pack ice tends to be both current and wind driven, while the icebergs tend to be largely current driven. Ice floes composed of old ridges can be less predictable due to their sail and keel features. These variations are usually sustained for shorter periods of time but ice of this type in open pack conditions warrant additional caution. Because the survey vessel 30 is towing the streamer of up to 6-km in length at relatively slow speeds (4.6 knots or less) and at a normal survey depth of −28 M, the streamer 60 may feather due to the ocean currents encountered at that depth that differ from the ocean's surface currents.

Safety margins may not be categorically measured based on distance because the margins can actually depend on many factors, including the reliability of set and drift information, the likelihood of ice keels constituting bona fide risks, the velocity of the survey vessel 30, the possibility of the survey vessel 30 need to slow down for ice before the risk feature is fully clear, etc. As a consequence, safety margins will vary according to latent circumstances. This will normally be subject to ongoing assessment and determination by operators.

To assess safety margins, a relationship exists between the height of a sail of a ridge in pack ice and the depth of a keel for that ridge. For heavy ridges, the keel depth is approximately up to 4 times the sail height. Preferably, a margin of safety of 20% can be applied when operators observe a ridge with a specific ridge height. Therefore, operators may consider multiple year ridges with a sail height of 5.6 M and higher as the maximum sail height allowed over the towed streamer 60.

Figure 11:
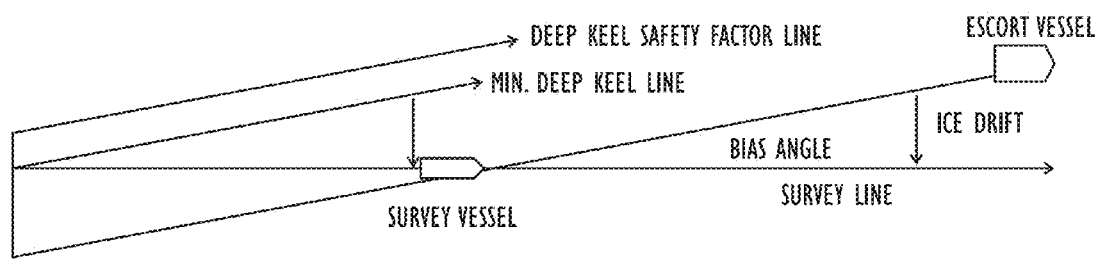
FIG. 11 diagrams the escort vessel accounting for a bias angle when clearing the seismic survey track for the survey vessel.

With these considerations in mind, discussion turns to FIG. 11, which shows an icebreaker 20 breaking a track for a survey vessel 30 traveling along a survey line. The icebreaker 20 breaks the track by biasing for the ice's set and drift. In this way, the cleared track will lie on the survey line when the survey vessel 30 reaches that point based on the survey vessel's speed and the set and drift of the ice. The angular relationship between the survey line and the icebreaker 20 is called the bias angle.

Ice features up-drift (i.e., upstream of the survey line in the drift of the ice floe) are carefully assessed to ensure no deep keels cross the seismic streamer (not shown) towed behind the survey vessel 30 once those features reach the survey line and possibly pass over the towed streamer. This can be expressed as a minimum deep keel line, as shown in FIG. 11. As an additional precaution, a deep keel safety factor line can also be calculated using drift rates that are purposely increased from the actual drift rates observed. When deep keels lie inside of this line, the vessels 20 and 30 take appropriate actions.

Figure 12A:
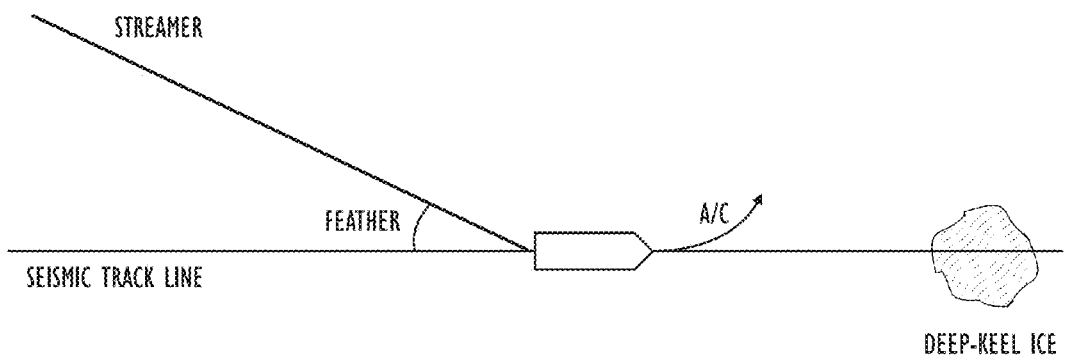
FIGS. 12A-12B diagram how the survey vessel can account for the feather of the streamer when avoiding deep-keel ice obstacles.

To avoid deep keel ice when feather is present in the streamer 60, operators take the direction of the feather into consideration to alter the course of the survey vessel 30 and the streamer 60 around the deep keel hazard. As shown in FIG. 12A, for example, operators alter the direction of the survey vessel 30 into the direction of the streamer's feather when the deep keel ice lies ahead on the survey line. This brings the feather in line with the survey vessel 30 as they pass the deep keel hazard. The survey vessel 30 can then resume its course on the survey line when safe to do so.

Figure 12B:
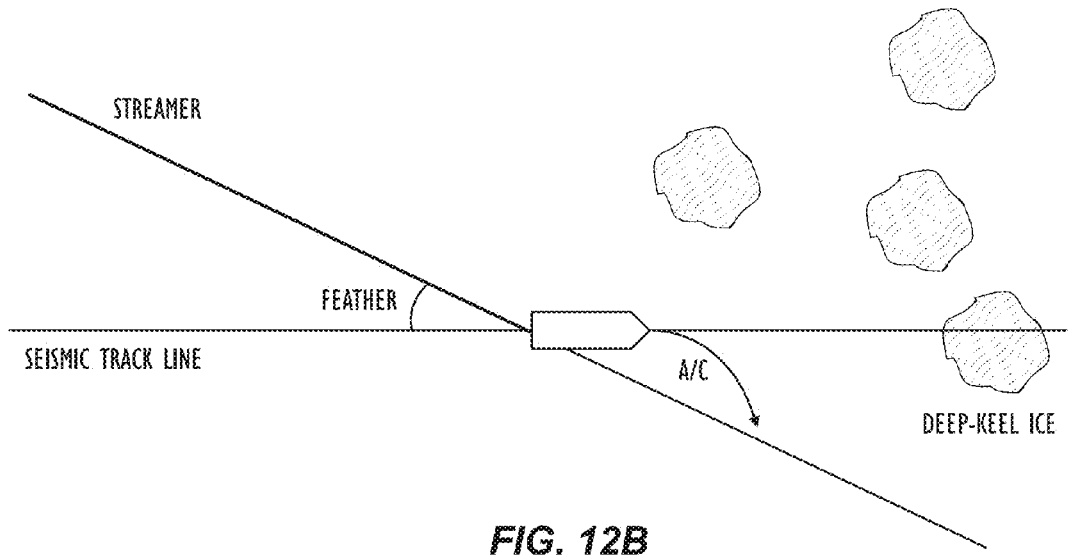

In some situations, however, the survey vessel 30 cannot turn into the direction of the feather because further hazards lie in that direction. In this instance as shown in FIG. 12B, operators turn the survey vessel 30 so that its direction is in line with the feather. The vessel 30 maintains that course until the streamer 60 is free of the hazard.

Even when surveying and accounting for the set and drift of the ice and any ice keels, the survey may still encounter ice with significant topographical relief features. These ice features are avoided whenever possible because they signify areas in the ice that are more difficult to break. Hummock fields and other features of old ice are preferably avoided as well. Additionally, ice may be encountered with significant snow cover, which can contribute significantly to navigational difficulty because the snow increases the coefficient of friction between the ice and the vessels' hulls.

F. Resupply Arrangements & Emergency Contingencies

The survey is conducted in hostile ice environments in the Arctic remote from support facilities so that some common field operations are followed. Because the icebreaker 20 may be nuclear powered, it may not require fuel resupply during the entire operation. The survey vessel 30, if fuelled with Marine Gas Oil (MGO), carries an adequate supply for the operation with a reserve capacity. In most cases, the vessels 20 and 30 are unable to circle for system failures due to ice coverage. In addition, it is highly unlikely that the sources 90 or streamers 60 can be retrieved or redeployed while in ice.

During ice management, ice conditions may be encountered on the survey where the safety of the streamer 60 is threatened. When this occurs, the vessels 20 and 30 proceed to waters where ice conditions would allow the streamers 60 to be recovered. Once at such a location, the streamers 60 are shortened to 600 M or less, and subsequent survey work can then continue with the reduced streamer length.

For example, threatening ice conditions may occur when sea ice conditions are severely ridged with estimated sail heights of 5.6 meters or greater or ridged with sail heights exceeding 4.5 meters or greater for an extended period of time such that any resultant ice incident would cause the vessel 30 to move to a lesser ice regime to be able to retrieve or redeploy the seismic equipment. Threatening ice conditions may also occur when one or more ice strikes occur on the streamer 60 or when a significant or catastrophic loss of streamer 60 and/or other in-water equipment has occurred. The determination of threatening ice condition can be based on visual observations as wells interpretations of satellite imagery, ice maps, etc., even when visibility may be impaired by snow or fog.

Despite the efforts by the ice management team and the available ice navigation equipment, the streamer 60 can break away from the survey vessel 30, or it may be necessary to separate the streamer 60 purposely from the survey vessel 30. Because the streamer 60 is located in an ice field, certain logistic problems are encountered that are different from normal seismic operations.

When a streamer 60 is lost or separated, this is communicated to the icebreaker 20 so it does not steam over the streamer 60. Operators stow all in-sea equipment onboard and make a search for the lost streamer 60. The most open sea area is checked first and is typically half way down the streamer 60 or even further back.

If the streamer 60 cannot be located straight away, the survey vessel 30 does not steam around to try to break up the ice because this could further damage the streamer 60. Instead, the sea drift is monitored for natural breakup of the ice so the survey vessel 30 can use the natural breakup to maneuver. Once the streamer 60 is located and it is felt safe to launch a work boat, recovery of the streamer 60 can made.

Despite the efforts by the ice management team and the available ice navigation equipment, there may be times when surveying in the ice that the survey vessel 30 is stopped by the surrounding ice. The survey vessel 30 may be halted in the ice due to malfunction, ice conditions, or other causes. If the vessel 30 is stopped while the in-sea equipment is deployed, the cables for the streamer 60 and source array 90 may become sucked in to the propeller and damaged. To minimize the possibilities of this, operators follow set procedures.

When the survey vessel 30 is halted, operators are immediately alerted. The icebreaker 20 and any other vessels in the vicinity can begin attempting to break out the survey vessel 30 but the orientation of the icebreaker 20 to the seismic streamers 60 is monitored to avoid fouling the streamers 60. When the survey vessel 30 is halted, the considerable kinetic energy of the seismic streamer 60 will cause it to continue forward despite efforts employed to mitigate this, such as using birds and digiFins, etc.

If it is first recognized that the survey vessel 30 will be physically stopped by the ice, tracking along the survey line can be preemptively terminated, and the vessel's speed can be reduced slowly. A lookout can be placed by the aft roller with communications to the bridge. If time allows, the retrieval of the guns of the seismic source 90 is commenced. Once the sources 90 are at the stern of the vessel 30, the front of the lead-in line on the streamers 60 can be recovered, and recovery of the lead-in line and the sub arrays continues until all of the heavy gear is on board. As streamer recovery continues, the gear is recovered slowly to ensure that slack does not drift under the vessel 30 while the birds and wings are being removed.

The icebreaker 20 may also be used to break an escape route for the survey vessel 30. If the survey vessel 30 is stopped due to ice, for example, the icebreaker 20 can break out the vessel 30 and resume close escort in some instances. However, the icebreaker's maneuvers need to be monitored so as not to foul the streamer 60. The ice navigation and streamer positioning system can display the shape and position of the streamer, which is useful in such circumstances.

Failure of a gun on the source 90 may necessitate the recovery of a source 90 for maintenance. The source 90 can be recovered in ice while leaving the seismic cables of the streamers 60 protected. In light ice conditions, the repaired source 90 can then be redeployed and the umbilical again stowed in the protective ice skeg 50.

When working with any of the cables in ice, contact of the cables with ice floes or fragments can cause unintended movements of the cables and equipment on deck. In addition, a floe or fragment once under the seismic streamer can under-run a length of the streamer and cause considerable damage.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of performing a marine seismic survey in icy waters, the method comprising:
    planning a survey track traversing a survey area based on initial ice conditions in the survey area having the icy waters;
    deploying a seismic system into the water from a survey vessel at the survey area;
    traversing the survey track with at least one escort vessel escorting the survey vessel;
    obtaining seismic data along the survey track by towing the seismic system from the survey vessel under the surface of the icy water; and
    monitoring the survey area along the survey track for actual ice conditions and handling the actual ice conditions along the survey track by—
        monitoring feather of the seismic system towed by the survey vessel,
        detecting an ice obstruction along the survey track ahead of the survey vessel at least using the at least one escort vessel, and
        turning the survey vessel away from the detected ice obstruction based on the monitored feather.

2. The method of claim 1, wherein planning the survey track traversing the survey area based on initial ice conditions in the survey area having the icy waters comprises at least one of:
    determining the initial ice conditions in the survey area having the icy waters; and
    ending the survey track in a region of the survey area with new or less ice coverage.

3. The method of claim 1, wherein deploying the seismic system into the water from the survey vessel at the survey area comprises at least one of:
    deploying a seismic source of the seismic system to extend vertically from the vessel;
    deploying a seismic source of the seismic system to extend horizontally from the vessel and supporting the seismic source submerged below the water surface with a flotation device;
    towing a seismic source of the seismic system with a tow point on the vessel below the water surface;
    towing a seismic streamer of the seismic system with a tow point on the vessel below the water surface; and
    protecting cables of the seismic system in a channel of a skeg extending below the water surface from the vessel.

4. The method of claim 1, wherein monitoring the survey area along the survey track for the actual ice conditions comprises at least one of:
    sharing monitored information between the survey vessel and the at least one escort vessel; and
    using one or more of ice radar, physical observations, weather programs, or ice maps.

5. The method of claim 1, wherein the acts of monitoring and handling further comprise:
    monitoring a speed of the survey vessel;
    determining set and drift of the ice obstruction in the icy waters relative to the survey track and the monitored speed; and
    clearing, instead of turning the survey vessel, the ice obstruction from a path of the survey vessel with the at least one escort vessel ahead of the survey vessel based on the set and drift so that the survey vessel traveling along the path follows the survey track.

6. The method of claim 5, wherein clearing the path comprises breaking and dispersing the ice obstruction encountered.

7. The method of claim 5, wherein clearing the path comprises clearing the path within a safety zone.

8. The method of claim 1, wherein if an area on a side of the survey vessel toward the feather is clear of the detected obstruction, turning the survey vessel comprises turning the survey vessel toward the side to which the survey system feathers.

9. The method of claim 1, wherein if an area on a side of the survey vessel toward the feather is not clear of the detected obstruction, turning the survey vessel comprises turning the survey vessel in line with the feature of the seismic system.

10. The method of claim 1, wherein detecting the ice obstruction comprises detecting an ice keel in the survey area greater than a predetermined depth expected to pass over the seismic system towed under the water surface; and wherein monitoring and handling further comprise submerging, instead of turning the survey vessel, the seismic system to a deeper depth below the water in response to the detected ice keel.

11. A method of performing a marine seismic survey in icy waters, the method comprising:
  planning a survey track traversing a survey area based on initial ice conditions in the survey area having the icy waters;
  deploying a seismic system into the water from a survey vessel at the survey area;
  traversing the survey track with at least one escort vessel escorting the survey vessel;
  obtaining seismic data along the survey track by towing the seismic system from the survey vessel under the surface of the icy water; and
  monitoring the survey area along the survey track for actual ice conditions and handling the actual ice conditions along the survey track by—
    detecting, from surface measurements of the actual ice conditions at least using the at least one escort vessel, an ice keel in the survey area greater than a predetermined depth expected to pass over the seismic system towed under the water surface; and
    submerging the seismic system to a deeper depth below the water in response to the detected ice keel.

12. The method of claim 11, wherein detecting the ice keel in the survey area greater than the predetermined size comprises detecting an ice ridge on the surface of the water above a predetermined sail height and correlating the detected ice ridge to a corresponding ice keel of the predetermined depth.

13. The method of claim 11, wherein the acts of monitoring and handling further comprise:
  monitoring feather of the seismic system towed by the survey vessel;
  and
  turning, instead of submerging the seismic system, the survey vessel away from the detected ice keel based on the monitored feather.

14. The method of claim 11, wherein detecting, from the surface measurements of the actual ice conditions at least using the at least one escort vessel, the ice keel in the survey area greater than the predetermined depth expected to pass over the seismic system towed under the water surface further comprises:
  monitoring a survey speed of the survey vessel; and
  determining the set and drift of the ice keel in the icy waters relative to the survey track and the survey speed.

15. The method of claim 11, wherein the acts of monitoring and handling further comprise clearing, instead of submerging the seismic system, the ice keel from a path of the survey vessel with the at least one escort vessel ahead of the survey vessel based on the set and drift so that the survey vessel traveling along the path follows the survey track.

16. The method of claim 11, wherein planning the survey track traversing the survey area based on initial ice conditions in the survey area having the icy waters comprises at least one of:
  determining the initial ice conditions in the survey area having the icy waters; and
  ending the survey track in a region of the survey area with new or less ice coverage.

17. The method of claim 11, wherein deploying the seismic system into the water from the survey vessel at the survey area comprises at least one of:
  deploying a seismic source of the seismic system to extend vertically from the vessel;
  deploying a seismic source of the seismic system to extend horizontally from the vessel and supporting the seismic source submerged below the water surface with a flotation device;
  towing a seismic source of the seismic system with a tow point on the vessel below the water surface;
  towing a seismic streamer of the seismic system with a tow point on the vessel below the water surface; and
  protecting cables of the seismic system in a channel of a skeg extending below the water surface from the vessel.

18. The method of claim 11, wherein monitoring the survey area along the survey track for the actual ice conditions comprises at least one of:
  sharing monitored information between the survey vessel and the at least one escort vessel; and
  using one or more of ice radar, physical observations, weather programs, or ice maps.

19. A method of performing a marine seismic survey in icy waters, the method comprising:
  obtaining seismic data along a survey track by towing, with a survey vessel, a seismic system beneath the surface of the icy water at a survey speed;
  determining set and drift of ice conditions along the survey track relative to the survey speed;
  determining a clearing track through the ice conditions in a region ahead of the survey vessel based on the survey speed and the set and drift of the ice conditions; and
  clearing the clearing track through the ice conditions in the region ahead of the survey vessel along the survey track using at least one escort vessel based on the survey speed and the set and drift so that the survey vessel traveling along the path follows the survey track.

20. The method of claim 19, further comprising:
  continuously handling actual ice conditions along the survey track by monitoring the survey area along the survey track for the actual conditions and using the at least one escort vessel to break or disperse ice encountered along the survey track.

21. The method of claim 19, wherein obtaining the seismic data comprises:
  deploying the seismic system into the water from the survey vessel at the survey area;
  traversing the survey track with the at least one escort vessel escorting the survey vessel; and obtaining the seismic data along the survey track by towing the seismic system from the survey vessel under the surface of the icy water.

22. The method of claim 19, wherein determining the set and drift of ice conditions along the survey track relative to the survey speed comprises differentiating between the set and drift of pack ice, bergs, and individual floes based on currents and wind forces.

23. The method of claim 19, wherein determining the clearing track in the region ahead of the survey vessel based on the survey speed and the set and drift of the ice conditions comprises compensating for the set and drift of the ice conditions and for an escort distance of the escort vessel from the survey vessel.

24. The method of claim 19, wherein clearing the clearing track comprises at least one of:
   breaking and dispersing ice encountered; and
   clearing the clearing track within a safety zone of the survey vessel.

25. A marine seismic survey system for surveying a survey track in a region of icy waters, comprising:
   a survey vessel having a protective skeg, at least one seismic streamer, and at least one seismic source, the at least one seismic streamer and source deployed from the survey vessel and protected from ice at the surface of the icy waters by the protective skeg, the survey vessel towing the least one seismic streamer and source along the survey track below the surface of the icy waters;
   an escort vessel handling ice in the region relative to the survey vessel and the survey track;
   control equipment monitoring ice conditions in the region and coordinating communication and navigation of the monitored ice conditions between the survey vessel and the escort vessel.

* * * * *